(12) United States Patent
Hatakeyama

(10) Patent No.: US 8,055,126 B2
(45) Date of Patent: Nov. 8, 2011

(54) ZOOM LENS, IMAGE CAPTURE APPARATUS, AND METHOD FOR CONTROLLING ZOOM LENS

(75) Inventor: Takeshi Hatakeyama, Chiba (JP)

(73) Assignee: Sony Corporation, Tokyo (JP)

( * ) Notice: Subject to any disclaimer, the term of this patent is extended or adjusted under 35 U.S.C. 154(b) by 362 days.

(21) Appl. No.: 12/320,466

(22) Filed: Jan. 27, 2009

(65) Prior Publication Data

US 2009/0208195 A1    Aug. 20, 2009

(30) Foreign Application Priority Data

Feb. 14, 2008  (JP) ................................. 2008-032742

(51) Int. Cl.
*G03B 17/00* (2006.01)
(52) U.S. Cl. .......................................... 396/52; 359/557
(58) Field of Classification Search .................... 396/52, 396/55; 359/678, 679, 695, 763, 764, 767, 359/676, 683, 745, 746, 757, 758, 557, 684
See application file for complete search history.

(56) References Cited

U.S. PATENT DOCUMENTS

| 5,880,892 | A  | * | 3/1999 | Ohtake ......................... 359/683 |
| 7,315,425 | B2 | * | 1/2008 | Wada ............................ 359/689 |
| 2002/0018301 | A1 | * | 2/2002 | Narimatsu et al. ............ 359/683 |
| 2006/0056044 | A1 | * | 3/2006 | Iwasawa ....................... 359/676 |
| 2006/0056055 | A1 | * | 3/2006 | Obama et al. ................. 359/689 |
| 2009/0046366 | A1 | * | 2/2009 | Take .............................. 359/557 |

FOREIGN PATENT DOCUMENTS

| JP | 01-189621 | 7/1989 |
| JP | 01-191113 | 8/1989 |
| JP | 11-282038 | 10/1999 |
| JP | 2001-124992 | 5/2001 |
| JP | 2001-356270 | 12/2001 |
| JP | 2006-071993 A | 3/2006 |

* cited by examiner

*Primary Examiner* — Clayton E Laballe
*Assistant Examiner* — Warren Fenwick
(74) *Attorney, Agent, or Firm* — Rader, Fishman & Grauer PLLC

(57) ABSTRACT

A zoom lens formed of a plurality of lens groups and performing zooming by changing separations between predetermined lens groups. A lens group closest to an object side is fixed in both optical axis directions during zooming, and has a reflecting member for folding an optical axis approximately 90 degrees. A final lens group positioned closest to an image side and fixed in both optical axis directions during zooming has a lens part group SG having positive refractive power and a lens part group RG arranged adjacent to the image side of the lens part group SG and having negative refractive power. A blur is corrected by shifting the lens part group SG in either direction perpendicular to the optical axis.

17 Claims, 19 Drawing Sheets

ZOOM LENS, IMAGE CAPTURE APPARATUS, AND METHOD FOR CONTROLLING ZOOM LENS

CROSS REFERENCES TO RELATED APPLICATIONS

The present invention contains subject matter related to Japanese Patent Application JP 2008-032742 filed in the Japanese Patent Office on Feb. 14, 2008, the entire contents of which are incorporated herein by reference.

BACKGROUND OF THE INVENTION

1. Field of the Invention

The present invention relates to a zoom lens and an image capture apparatus having a shake correcting function, i.e., a function of correcting blurry images resulting from camera vibration. Particularly, the invention relates to a zoom lens and an image capture apparatus which are suitable for an imaging optical system of digital input/output equipment such as digital still cameras and digital video cameras, which also have a high zooming ratio and the shake correcting function, and which are particularly superior in size and thickness reductions, as well as to a method for controlling the zoom lens.

2. Description of the Related Art

In recent years, image capture apparatuses using a solid-state imager device, such as digital still cameras, have become increasingly popular, demanding still higher image quality. In, e.g., digital still cameras using an imager device having a large number of pixels, in particular, an imaging lens, particularly a zoom lens, superior in image forming performance ready for the solid-state imager device having a large number of pixels is called for.

Particularly of late, there is a strong demand for the shake correcting function for preventing blurry images caused by camera shake during imaging. In addition, miniaturization is strongly called for, with a special demand for a zoom lens small in a depth direction, i.e., in an entrance optical axis direction.

For example, a zoom lens disclosed in Japanese Unexamined Patent Application Publication No. 01-189621 has a plurality of lens groups, and corrects a blur caused when the zoom lens vibrates, by shifting a first lens group positioned closest to an object side, in any direction perpendicular to an optical axis.

Furthermore, a zoom lens disclosed in Japanese Unexamined Patent Application Publication No. 11-282038 has a plurality of lens groups, and corrects a blur caused when the zoom lens vibrates, by shifting a movable lens group moving in an optical axis direction during zooming or focusing, in either direction perpendicular to the optical axis.

Furthermore, a zoom lens disclosed in Japanese Unexamined Patent Application Publication No. 2001-124992 or 2001-356270 has a first lens group having positive refractive power, a second lens group having negative refractive power, a third lens group having positive refractive power, a fourth lens group having negative refractive power, and a fifth lens group having positive refractive power arranged in order of mention from the object side, performs zooming by moving at least the second lens group and the fourth lens group on the optical axis, and corrects a blur caused when the zoom lens vibrates by moving the whole third lens group positioned near an aperture stop, in either direction perpendicular to the optical axis.

Furthermore, a zoom lens disclosed in Japanese Unexamined Patent Application Publication No. 01-191113 has a plurality of lens groups, and corrects a blur caused when the zoom lens vibrates, by shifting a final lens group positioned closest to an image side, in either direction perpendicular to the optical axis.

Furthermore, a zoom lens disclosed in Japanese Unexamined Patent Application Publication No. 2006-71993 has a plurality of lens groups, in which a final lens group positioned closest to the image side and having negative refractive power is fixed in both optical axis directions during zooming and has a front group having negative power and a rear group having positive power. By configuring the rear group having positive power or a part thereof ("blur correcting lens group") to be movable in either direction orthogonal to the optical axis, the zoom lens corrects a blur caused when it vibrates, by moving the blur correcting lens group in either direction perpendicular to the optical axis.

Meanwhile, in some other zoom lenses, an optical system is folded by inserting a prism between lenses, thereby realizing a size reduction in the entrance optical axis direction, and lenses are cut with respect to a short-side direction of the imager device, thereby realizing a thickness reduction in the structure of a lens barrel.

SUMMARY OF THE INVENTION

However, in the zoom lens disclosed in Japanese Unexamined Patent Application Publication No. 01-189621, vibration isolation is implemented by the first lens group positioned closest to the object side. Since the first lens group transmits an off-axis light beam therethrough away from the optical axis, its lens diameter is made too large to realize a sufficient size reduction.

Furthermore, in the zoom lens disclosed in Japanese Unexamined Patent Application Publication No. 11-282038, vibration isolation is implemented by the lens group movable in an optical axis direction during zooming or focusing, thereby complicating a driving mechanism for vibration isolation.

Furthermore, in the zoom lens disclosed in Japanese Unexamined Patent Application Publication No. 2001-124992 or 2001-356270, vibration isolation is implemented by the lens group positioned near the aperture stop and fixed during zooming. In this configuration, an aperture stop mechanism tends to interfere with a driving mechanism for vibration isolation. In addition, the lens diameter of the vibration isolating group is made too large to realize a sufficient size reduction.

Furthermore, in the zoom lens disclosed in Japanese Unexamined Patent Application Publication No. 01-191113, vibration isolation is implemented by shifting the whole final lens group positioned closest to the image side, in either direction perpendicular to the optical axis. The lens diameter of the final lens group is made too large to realize a sufficient size reduction.

Furthermore, in the zoom lens disclosed in Japanese Unexamined Patent Application Publication No. 2006-71993, the final lens group positioned closest to the image side and having negative refractive power is constructed of the front group having negative power and the rear group having positive power, and vibration isolation is implemented by shifting the rear group having positive power or the like, in either direction perpendicular to the optical axis. The size of a vibration isolating unit including a driving mechanism for vibration isolation imposes a restriction on the realization of a sufficient size reduction.

Furthermore, in the case where a size reduction in the entrance optical axis direction is realized by folding the optical system while inserting the prism between lenses, lens shifting directions during shake correction extend parallel to the entrance optical axis direction. Thus, the vibration isolating unit including the driving mechanism tends to become the largest protrusion in the lens barrel, thereby restricting the size and thickness reductions.

Accordingly, it is desirable to achieve the size and thickness reductions of the whole zoom lens including the vibration isolating unit in which the driving mechanism is arranged, while allowing shake correction based on lens shifting.

In one embodiment of the present invention, there is provided a zoom lens formed of a plurality of lens groups and performing zooming by changing separations between predetermined lens groups. In the zoom lens, a lens group closest to an object side is fixed in both optical axis directions during zooming and has a reflecting member for folding an optical axis approximately 90 degrees, and a final lens group positioned closest to an image side and fixed in both optical axis directions during zooming has a lens part group SG having positive refractive power and a lens part group RG arranged adjacent to the image side of the lens part group SG and having negative refractive power. A blur is corrected by shifting the lens part group SG in either direction perpendicular to the optical axis.

In such an embodiment of the present invention, shake correction based on lens shifting can be realized, yet the size and thickness reductions of the whole zoom lens including a vibration isolating unit in which a driving mechanism is arranged, can be realized.

Here, in the above-mentioned zoom lens, a combined focal length of the lens part group SG and the lens part group RG is positive. Namely, a focal length of the lens part group SG in the zoom lens becomes shorter than a focal length of the lens part group RG. This advantageously prevents excessive increase in the sensitivity of shake correction performed by shifting the lens part group SG.

Furthermore, in an additional configuration, the zoom lens satisfies a conditional formula (1) $-0.8<fs/fr<-0.1$, where fs is the focal length of the lens part group SG, and fr is the focal length of the lens part group RG.

Furthermore, in another additional configuration, the zoom lens satisfies a conditional formula (2) $0.6<(1-\beta s)\times\beta r<1.8$, where $\beta s$ is a transverse magnification of the lens part group SG, and $\beta r$ is a transverse magnification of the lens part group RG.

Furthermore, in still another additional configuration, the zoom lens satisfies a conditional formula (3) $0.02<D_{SR}/fw<0.40$, where $D_{SR}$ is a surface separation between a surface closest to the image side of the lens part group SG and a surface closest to the object side of the lens part group RG, and fw is a focal length of a total system at a wide-angle end.

Furthermore, in the zoom lens having any of the above-mentioned configurations, if the plurality of lens groups have a five-group construction, the zoom lens performs zooming by moving at least a second lens group and a fourth lens group excluding a fifth lens group, along the optical axis.

Furthermore, in the zoom lens having any of the above-mentioned configurations, if the plurality of lens groups have a six-group construction, the zoom lens performs zooming by moving at least a second lens group, a fourth lens group, and a fifth lens group excluding a sixth lens group, along the optical axis.

Furthermore, in another embodiment of the present invention, there is provided an image capture apparatus including a zoom lens, and an imager device converting an optical image formed by the zoom lens into an electrical signal. In the image capture apparatus, the zoom lens is formed of a plurality of lens groups, and performs zooming by changing separations between lens groups. A lens group closest to an object side is fixed in both optical axis directions during zooming and has a reflecting member for folding an optical axis at 90 degrees, and a final lens group positioned closest to an image side and fixed in both optical axis directions during zooming has a lens part group SG having positive refractive power and a lens part group RG arranged adjacent to the image side of the lens part group SG and having negative refractive power. A blur is corrected by shifting the lens part group SG in either direction perpendicular to the optical axis.

In such an embodiment of the present invention, shake correction based on lens shifting can be realized, yet the size and thickness reductions of the whole zoom lens including a vibration isolating unit in which a driving mechanism is arranged, can be realized. Thus, it becomes possible to realize the size and thickness reductions of the image capture apparatus.

Here, in the zoom lens of the above-mentioned image capture apparatus, a combined focal length of the lens part group SG and the lens part group RG is positive. Namely, a focal length of the lens part group SG in the zoom lens of the image capture apparatus becomes shorter than a focal length of the lens part group RG. This advantageously prevents excessive increase in the sensitivity of shake correction performed by shifting the lens part group SG.

Furthermore, in an additional configuration, the image capture apparatus satisfies a conditional formula (1) $-0.8<fs/fr<-0.1$, where fs is the focal length of the lens part group SG, and fr is the focal length of the lens part group RG.

Furthermore, in another additional configuration, the image capture apparatus satisfies a conditional formula (2) $0.6<(1-\beta s)\times\beta r<1.8$, where $\beta s$ is a transverse magnification of the lens part group SG, and $\beta r$ is a transverse magnification of the lens part group RG.

Furthermore, in still another additional configuration, the image capture apparatus satisfies a conditional formula (3) $0.02<D_{SR}/fw<0.40$, where $D_{SR}$ is a surface separation between a surface closest to the image side of the lens part group SG and a surface closest to the object side of the lens part group RG, and fw is a focal length of a total system at a wide-angle end.

Furthermore, in still another additional configuration, the image capture apparatus includes shake detecting means for detecting a shake of an apparatus body, shake control means for calculating a blur correcting angle for correcting a blur attributable to the shake detected by the shake detecting means, and generating a driving signal in order to bring the lens part group SG into a position which is based on the blur correcting angle, and a shake driving section shifting the lens part group SG in either direction perpendicular to the optical axis on the basis of the driving signal generated by the shake control means.

In such an embodiment of the present invention, it becomes possible to realize the size and thickness reductions of the image capture apparatus including the shake detecting means, the shake control means, and the shake driving section.

Furthermore, in still another embodiment of the present invention, there is provided a method for controlling a zoom lens formed of a plurality of lens groups and performing zooming by changing separations between predetermined lens groups. The method controls the zoom lens in which a lens group closest to an object side is fixed in both optical axis directions during zooming and has a reflecting member for folding an optical axis at 90 degrees, and a final lens group positioned closest to an image side and fixed in both optical axis directions during zooming has a lens part group SG having positive refractive power and a lens part group RG arranged adjacent to the image side of the lens part group SG and having negative refractive power. The zoom lens corrects a blur by shifting the lens part group SG in either direction perpendicular to the optical axis.

In such an embodiment of the present invention, shake correction based on lens shifting can be realized, yet the size and thickness reductions of the whole zoom lens including a vibration isolating unit in which a driving mechanism is arranged, can be realized.

According to the above-mentioned embodiments of the present invention, shake correction based on lens shifting can be realized, yet it becomes possible to achieve the size and thickness reductions of the whole zoom lens including the vibration isolating unit in which the driving mechanism is arranged. Furthermore, by using this zoom lens, shake correction can be realized, yet it becomes possible to achieve the size and thickness reductions of the image capture apparatus.

DESCRIPTION OF THE PREFERRED EMBODIMENTS

An embodiment of the present invention will be described below with reference to the drawings.

<Lens Group Constructions of a Zoom Lens>

An example zoom lens according to the present embodiment is constructed, as shown in each of FIGS. 1, 5, and 13, by arranging, in the following order from an object side, a first lens group GR1 having positive refractive power, a second lens group GR2 having negative refractive power, a third lens group GR3 having positive refractive power, a fourth lens group GR4 having positive refractive power, and a fifth lens group GR5 having negative refractive power. The first lens group GR1, the third lens group GR3, and the fifth lens group GR5 are fixed during zooming. The second lens group GR2 and the fourth lens group GR4 perform zooming by moving in optical axis directions. The fourth lens group GR4 performs focusing during near-distance imaging by moving in an optical axis direction.

Figure 9:
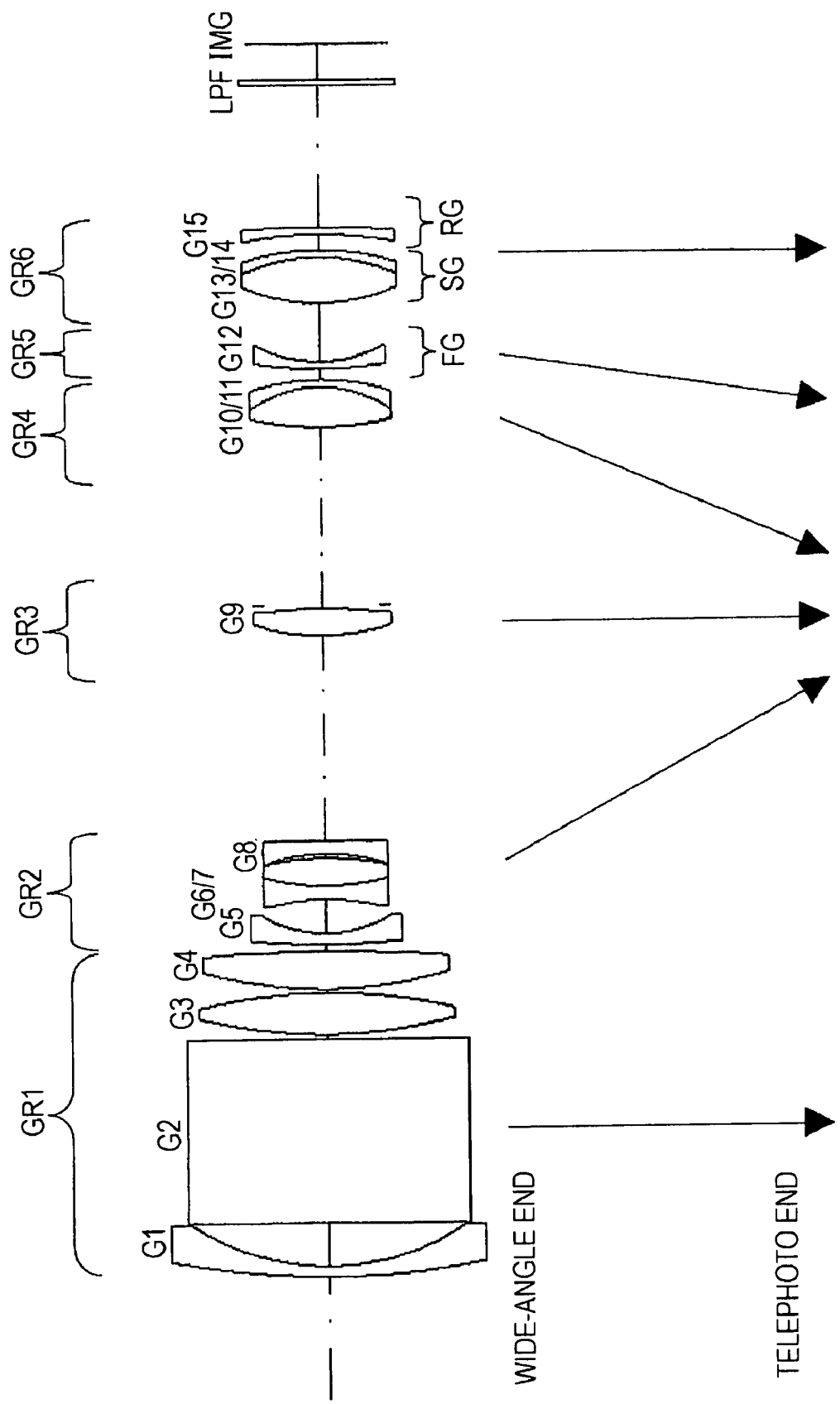
FIG. 9 is a schematic diagram showing the lens construction of a third embodiment of the zoom lens according to the present invention.

Furthermore, another example zoom lens according to the present embodiment is constructed, as shown in FIG. 9, by arranging, in the following order from the object side, a first lens group GR1 having positive refractive power, a second lens group GR2 having negative refractive power, a third lens group GR3 having positive refractive power, a fourth lens group GR4 having positive refractive power, a fifth lens group GR5 having negative refractive power, and a sixth lens group GR6 having positive refractive power. The first lens group GR1, the third lens group GR3, and the sixth lens group GR6 are fixed during zooming. The second lens group GR2, the fourth lens group GR4, and the fifth lens group GR5 perform zooming by moving in optical axis directions. The fourth lens group GR4 or the fifth lens group GR5 performs focusing during near-distance imaging by moving in an optical axis direction.

In either example, the lens group closest to the object side is fixed in both optical axis directions during zooming, and also has a reflecting member for folding an optical axis approximately 90 degrees. Furthermore, in either example, the final lens group in the zoom lens has a lens part group SG having positive refractive power, and a lens part group RG arranged adjacent to an image side of the lens part group SG and having negative refractive power, and an image is shifted by moving the lens part group SG (hereinafter called "blur correcting lens group") in either direction orthogonal to the optical axis.

Figure 1:
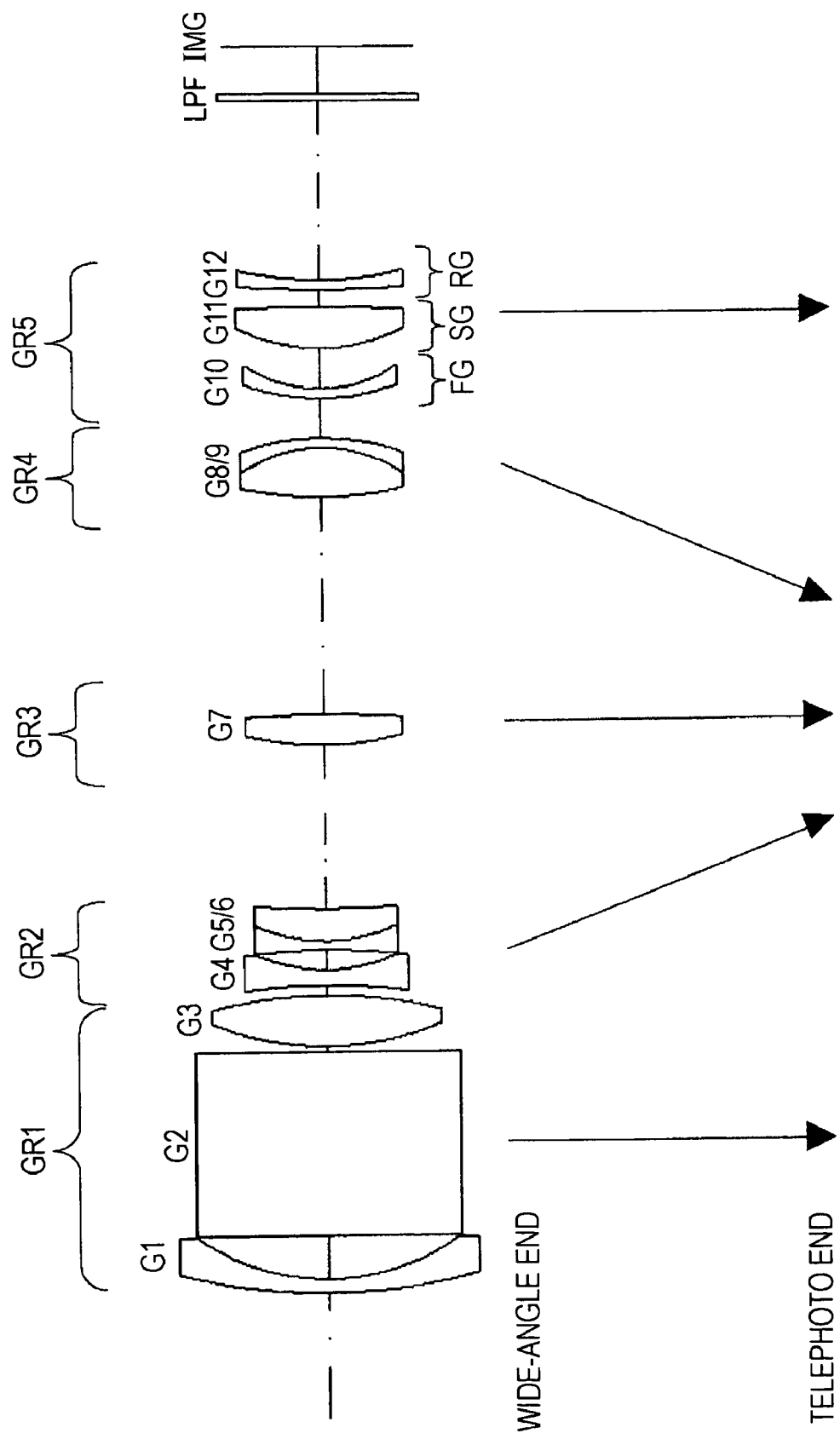
FIG. 1 is a schematic diagram showing the lens construction of a first embodiment of a zoom lens according to the present invention.
Figure 5:
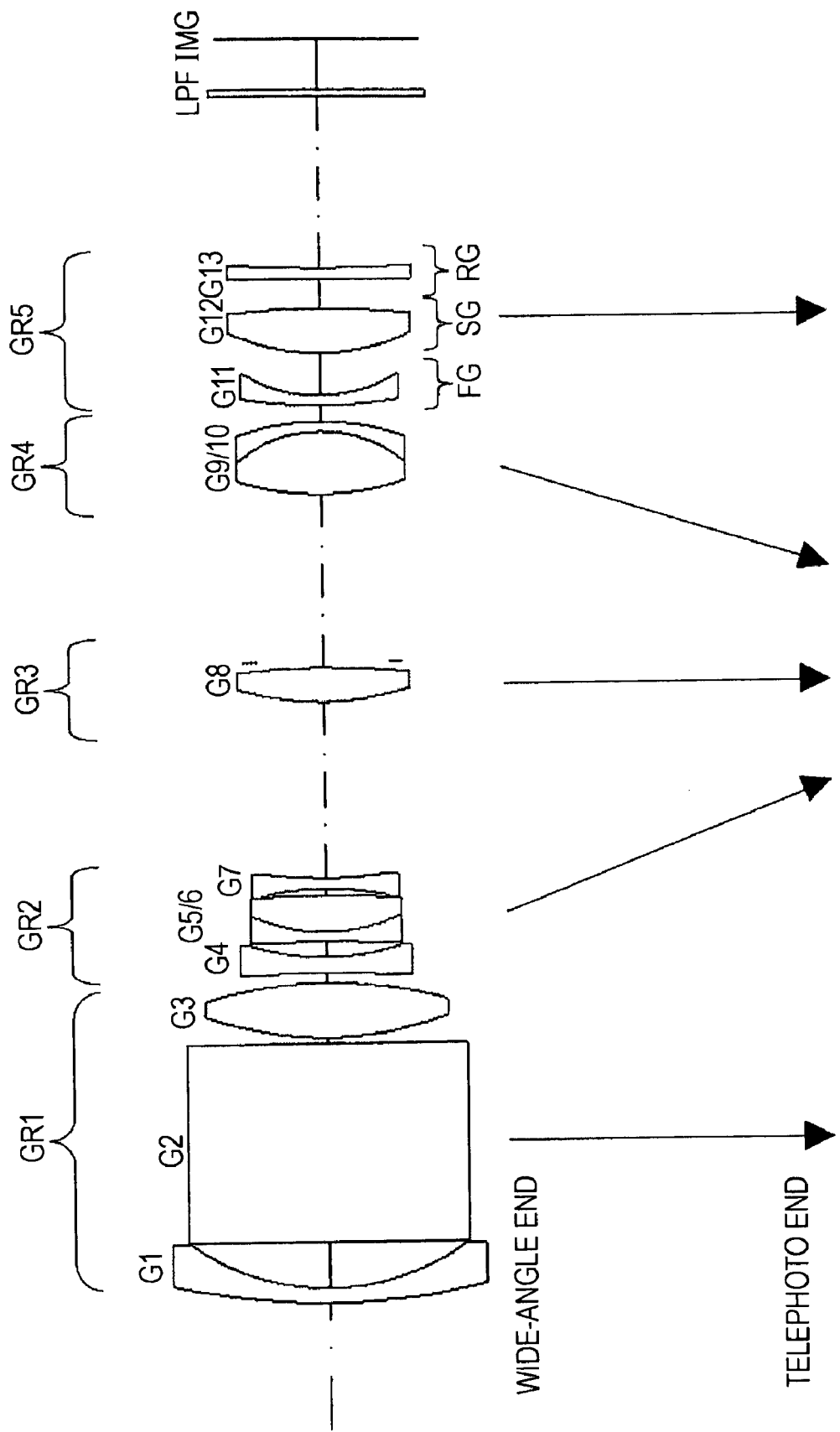
FIG. 5 is a schematic diagram showing the lens construction of a second embodiment of the zoom lens according to the present invention.
Figure 13:
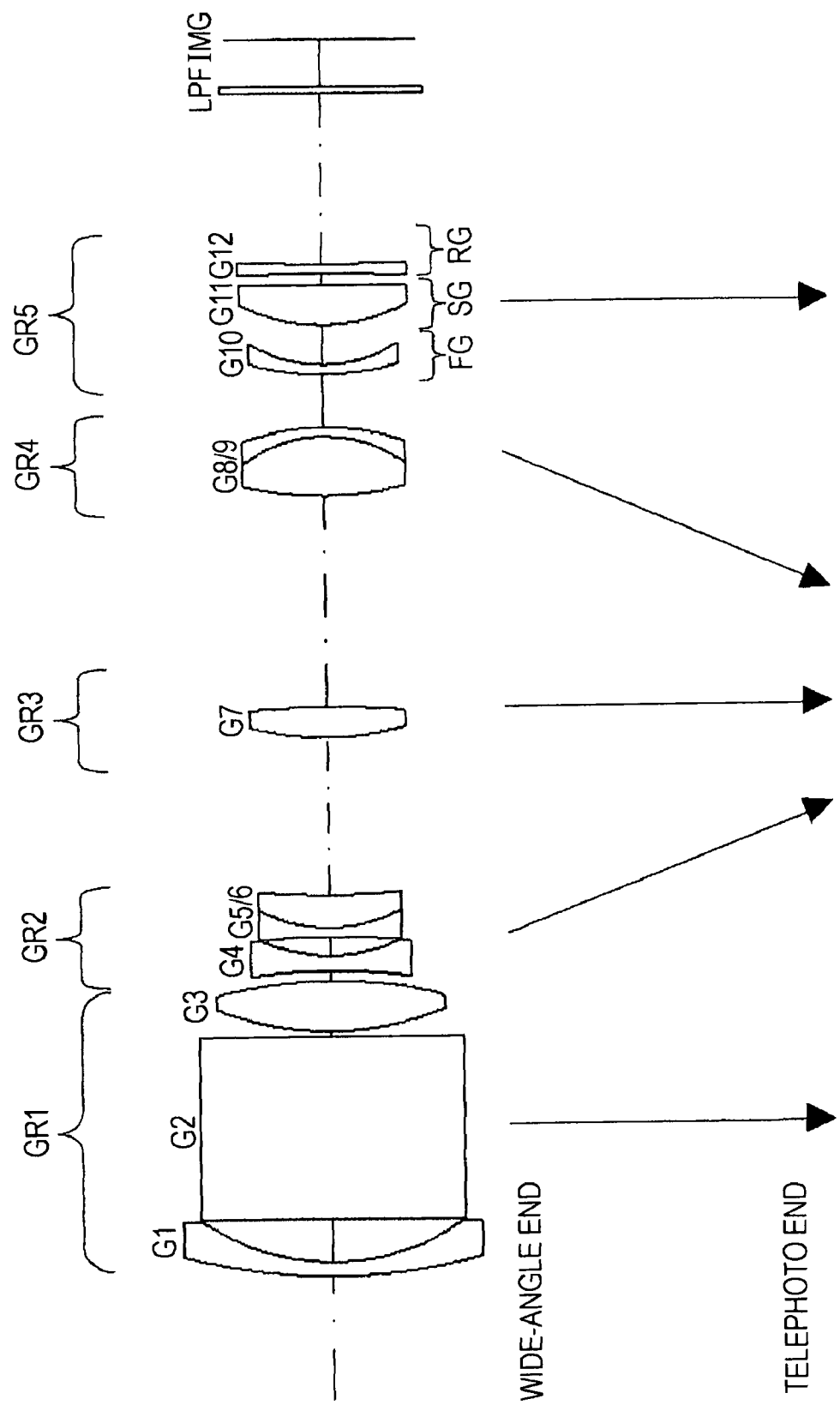
FIG. 13 is a schematic diagram showing the lens construction of a fourth embodiment of the zoom lens according to the present invention.

Specifically, the blur correcting lens group is a lens G11 of the fifth lens group in the zoom lens according to the present embodiment shown in FIG. 1, a lens G12 of the fifth lens group in the zoom lens according to the present embodiment shown in FIG. 5, a lens G13/G14 of the sixth lens group in the zoom lens according to the present embodiment shown in FIG. 9, and a lens G11 of the fifth lens group in the zoom lens according to the present embodiment shown in FIG. 13. By arranging a lens part group FG having negative refractive power, adjacent to the object side of this blur correcting lens group, light rays are sprung up at a stroke. It is also configured such that light rays which are made approximately telecentric by the blur correcting lens group having positive refractive power are sprung up again by a lens part group RG having negative refractive power.

With constructions such as mentioned above, the diameter of the lens G1 closest to the object side in the first lens group GR1 is decreased, thereby allowing a size reduction of the whole zoom lens. Furthermore, by decreasing an exit pupil distance of the total lens system with the lens part group RG having negative refractive power, the lens diameter of the blur correcting lens group is decreased, and also by increasing the ratio of an image shifting amount to a correcting-lens shifting amount, a vibration isolating unit including a driving mechanism can be miniaturized.

Furthermore, the blur correcting lens group is arranged in the final lens group, thereby allowing reductions in its size and the number of lenses. Namely, by arranging the blur correcting lens group within the final lens group, the blur correcting lens group does not interfere with driving mechanisms of the movable groups and an aperture stop, and thus even if the driving mechanism of the blur correcting lens group is arranged, the whole zoom lens can be miniaturized.

Furthermore, when shake correction is performed by moving a lens group in either direction orthogonal to the optical axis, there arises a problem of aberration fluctuations, especially, of distortion fluctuations, and in order to correct these fluctuations, the number of lenses is increased. However, in the zoom lens according to the present embodiment, shake correction is performed by moving a lens group at which light rays become telecentric, in either direction orthogonal to the optical axis, thereby reducing the aberration fluctuations. Thus, high optical performance can be maintained without increasing the number of lenses.

In the above-mentioned lens constructions, the zoom lens according to the present embodiment has a combined focal length of the lens part group SG and the lens part group RG, which is positive. Namely, the focal length of the lens part group SG in the zoom lens becomes shorter than the focal length of the lens part group RG. This advantageously prevents excessive increase in the sensitivity of shake correction performed by shifting the lens part group SG.

Furthermore, in the above-mentioned lens constructions, the zoom lens according to the present embodiment satisfies the following conditional formula (1):

$$-0.8 < fs/fr < -0.1 \qquad (1)$$

The conditional formula (1) is intended to define a focal length ratio of the blur correcting lens group SG to the lens part group RG arranged adjacent to the image side of the blur correcting lens group SG. If the value of fs/fr falls below the lower limit, i.e., if the negative power of the lens part group RG becomes too strong, even a small movement of the blur correcting lens group causes a large shift of an image. It is necessary that the zoom lens have highly accurate control, for example, high part accuracy, high assembling accuracy, and highly accurate control over its detecting and driving systems, and thus making itself extremely expensive. If the value of fs/fr exceeds the upper limit, i.e., if the negative power of the lens part group RG becomes too weak, an amount of movement of the blur correcting lens group necessary to shift the image by a predetermined amount becomes so large that the size of the driving system increases to prevent the size reduction of the zoom lens.

Furthermore, in the above-mentioned lens constructions, the zoom lens according to the present embodiment satisfies the following conditional formula (2):

$$0.6 < (1-\beta s) \times \beta r < 1.8 \qquad (2)$$

The conditional formula (2) is intended to define a ratio at which the image is shifted with respect to the amount of movement of the blur correcting lens group SG. If the value of $(1-\beta s) \times \beta r$ falls below the lower limit, the amount of movement of the blur correcting lens group necessary to shift the image by a predetermined amount increases, thereby increasing the size of the driving system and thus preventing the size reduction of the zoom lens. If the value of $(1-\beta s) \times \beta r$ exceeds the upper limit, even a small movement of the blur correcting lens group causes a large shift of the image. It is necessary that the zoom lens have highly accurate control, for example, high part accuracy, high assembling accuracy, and highly accurate control over its detecting and driving systems, and thus making itself extremely expensive.

The conditional formula (2) may be satisfied singly or along with the conditional formula (1).

In the zoom lens according to the present embodiment, the reflecting member for folding the optical axis approximately 90° is arranged in the first lens group GR1 being a fixed group. This arrangement allows a size reduction in a direction of entrance optical axis to the zoom lens (optical axis of the lens positioned closest to the object side), thereby allowing a decrease in the depth of an image capture apparatus such as a digital still camera, i.e., allowing a thickness reduction of the apparatus. As mentioned above, if a prism is used as the reflecting member for folding the optical axis, it is desirable to use glass having high refractive index. This allows a miniaturization of the reflecting member, and thus is advantageous in the size reduction of the whole zoom lens.

In the zoom lens according to the present embodiment, by arranging the lens part group FG having negative refractive power adjacent to the object side of the blur correcting lens group, it allows a size reduction of the whole zoom lens. Furthermore, by making the lens part group FG movable in an optical axis direction during zooming, a high zooming ratio can be achieved.

It is desirable for the zoom lens according to the present embodiment to perform focusing during near-distance imaging by moving a lens group positioned closer to the image side than the aperture stop, in an optical axis direction. If focusing is performed by the lens group positioned closer to the object side than the aperture stop, a change in view angle during focusing becomes larger than necessary.

Furthermore, in the above-mentioned lens constructions, the zoom lens according to the present embodiment satisfies the following conditional formula (3):

$$0.02 < D_{SR}/fw < 0.40 \qquad (3)$$

The conditional formula (3) is intended to define a ratio of the surface separation between the blur correcting lens group SG and the lens part group RG to a focal length of a total system at a wide-angle end. If the value of $D_{SR}/fw$ falls below the lower limit, it is not desirable in that the lens part group RG tends to interfere with the blur correcting lens group and a driving mechanism for vibration isolation. If the value of $D_{SR}/fw$ exceeds the upper limit, the negative power of the lens part group RG is increased in order to decrease the size of the blur correcting lens group, thereby making aberration correction difficult.

The conditional formula (3) may be satisfied singly, along with either the conditional formula (1) or (2), or along with both the conditional formulae (1) and (2).

Furthermore, in the zoom lens according to the present embodiment, it is further preferable to use an ND filter or a liquid crystal dimming device, instead of changing the aperture diameter for light amount adjustment, in order to reduce the size and prevent image deterioration due to diffraction on narrowing the aperture.

Furthermore, in the zoom lens according to the present embodiment, it is desirable to correct chromatic deviations to be caused during shake correction, using electrical signal processing. This decreases loads to be born by the lenses for chromatic aberration correction, thereby allowing the number of lenses to be decreased and facilitating the design of lenses.

Specific Embodiments

Specific embodiments of the zoom lens according to the present embodiment will be described below with reference to FIGS. 1-16 and Tables 1-13. It is noted that symbols used in numerical embodiments have the following meanings:

ω: half view angle;
si: an i-th surface counted from the object side;
ri: radius of curvature of the surface si;
di: surface separation between the i-th surface and an (i+1)-th surface counted from the object side;
ni: refractive index at d-line (wavelength: 587.6 nm) of an i-th lens; and
vi: Abbe number at d-line (wavelength: 587.6 nm) of the i-th lens.

Furthermore, the shape of an aspherical surface is represented by the following formula, assuming that an X-axis extends in an optical axis direction, the height extending in a direction perpendicular to the optical axis is h, and the vertex of the surface is the origin.

$$X = \frac{h^2/R}{1+\sqrt{1-(1+K)h^2/R^2}} + \sum A_i h^i \quad \text{[Formula 1]}$$

In the above formula,
Ai: an i-th-order aspherical coefficient;
R: radius of curvature; and
K: cone constant.

It is noted that in the following description (including lens data in the tables), 10 to an i-th power (e.g., $1.2 \times 10^{-2}$) is represented using E (e.g., 1.2E-02).

First Embodiment

FIG. 1 is a diagram showing the lens construction of a first embodiment of the zoom lens according to the present invention. In the first embodiment, the zoom lens is constructed by arranging, in the following order from the object side, a first lens group GR1 having positive refractive power, a second lens group GR2 having negative refractive power, a third lens group GR3 having positive refractive power, a fourth lens group GR4 having positive refractive power, and a fifth lens group GR5 having negative refractive power.

The first lens group GR1 is constructed of a negative lens G1, a right prism G2 for folding an optical axis at 90°, and a positive lens G3 having both surfaces formed of aspherical surfaces. The second lens group GR2 is constructed of a negative lens G4, and a cemented lens formed of a negative lens G5 and a positive lens G6. The third lens group GR3 is constructed of a positive lens G7 having both surfaces formed of aspherical surfaces. The fourth lens group GR4 is constructed of a cemented lens formed of a positive lens G8 and a negative lens G9. The fifth lens group GR5 is constructed of a lens part group FG formed of a negative lens G10, a lens part group SG formed of a positive lens G11, and a lens part group RG formed of a negative lens G12. Image shifting is performed by moving the lens part group SG (blur correcting lens group) in either direction perpendicular to the optical axis.

Furthermore, the first lens group GR1, the third lens group GR3, and the fifth lens group GR5 are fixed during zooming. The second lens group GR2 and the fourth lens group GR4 perform zooming by moving in optical axis directions. The fourth lens group GR4 performs focusing during near-distance imaging by moving in an optical axis direction.

It is noted that in FIG. 1, an LPF is a low-pass filter inserted between the fifth lens group GR5 and an image capture plane IMG. Furthermore, an aperture stop IR is arranged near the image side of the third lens group GR3, and is fixed during zooming.

Table 1 shows optical system data of a numerical embodiment 1 in which specific numerical values are applied to the first embodiment. In the following table, "INFINITY" indicates that the surface is formed of a plane.

TABLE 1

| si | ri | di | ni | vi |
|---|---|---|---|---|
| 1 | r1 = 23.9825 | d1 = 0.600 | n1 = 1.92286 | v1 = 20.9 |
| 2 | r2 = 9.4077 | d2 = 1.800 | | |
| 3 | r3 = INFINITY | d3 = 7.800 | n3 = 1.90366 | v3 = 31.3 |
| 4 | r4 = INFINITY | d4 = 0.200 | | |
| 5 | r5 = 12.2493 | d5 = 2.173 | n5 = 1.69350 | v5 = 53.2 |
| 6 | r6 = −17.5388 | d6 = VARIABLE | | |
| 7 | r7 = −50.0000 | d7 = 0.650 | n7 = 1.85135 | v7 = 40.1 |
| 8 | r8 = 5.9975 | d8 = 0.826 | | |
| 9 | r9 = −24.8904 | d9 = 0.400 | n9 = 1.78590 | v9 = 43.9 |
| 10 | r10 = 7.0507 | d10 = 1.354 | n10 = 1.92286 | v10 = 20.9 |
| 11 | r11 = 41.7324 | d11 = VARIABLE | | |
| 12 | r12 = 12.1611 | d12 = 1.300 | n12 = 1.69350 | v12 = 53.2 |
| 13 | r13 = −50.0372 | d13 = 0.200 | | |
| 14 | r14 = INFINITY | d14 = 1.500 | | APERTURE STOP |
| 15 | r15 = INFINITY | d15 = VARIABLE | | |
| 16 | r16 = 14.9686 | d16 = 2.072 | n16 = 1.58313 | v16 = 59.5 |
| 17 | r17 = −5.9077 | d17 = 0.400 | n17 = 1.90366 | v17 = 31.3 |
| 18 | r18 = −10.1355 | d18 = VARIABLE | | |
| 19 | r19 = 9.5100 | d19 = 0.400 | n19 = 1.90366 | v19 = 31.3 |
| 20 | r20 = 5.7169 | d20 = 1.700 | | |
| 21 | r21 = 7.6231 | d21 = 1.710 | n21 = 1.48749 | v21 = 70.4 |
| 22 | r22 = −139.4932 | d22 = 0.750 | | |
| 23 | r23 = 50.0000 | d23 = 0.400 | n23 = 1.84666 | v23 = 23.8 |
| 24 | r24 = 14.5022 | d24 = 7.512 | | |
| 25 | r25 = INFINITY | d25 = 0.300 | n25 = 1.51680 | v25 = 64.2 |
| 26 | r26 = INFINITY | d26= | | |

In the first embodiment, the surface separation d6 between the first lens group GR1 and the second lens group GR2, the surface separation d11 between the second lens group GR2 and the third lens group GR3, the surface separation d15 between the aperture stop IR and the fourth lens group GR4, and the surface separation d18 between the fourth lens group GR4 and the fifth lens group GR5 are variable during zooming. Values of the respective separations d6, d11, d15, and d18 in the numerical embodiment 1 measured at a wide-angle end position, an intermediate focal position between the wide-angle end and the telephoto end, and a telephoto end position are shown in Table 2 along with focal lengths, F-numbers, and half view angles ω.

TABLE 2

| FOCAL LENGTH | 6.50 | 12.37 | 24.00 |
|---|---|---|---|
| Fno | 3.60 | 3.96 | 4.72 |
| ω (degrees) | 31.98 | 16.99 | 8.87 |
| d6 | 0.400 | 4.178 | 6.902 |
| d11 | 6.902 | 3.124 | 0.400 |
| d15 | 7.477 | 4.366 | 1.037 |
| d18 | 1.675 | 4.786 | 8.115 |

In the first embodiment, both surfaces s5, s6 of the positive lens G3 in the first lens group GR1, both surfaces s7, s8 of the negative lens G4 in the second lens group GR2, the object-side surface s12 of the positive lens G7 in the third lens group GR3, and the object-side surface s16 of the cemented lens in the fourth lens group GR4 are formed of aspherical surfaces. The 4th-, 6th-, 8th-, and 10th-order aspherical coefficients of these surfaces s5, s6, s7, s8, s12, and s16 in the numerical embodiment 1 are shown in Table 3 along with cone constants K.

TABLE 3

| si | K | $A_4$ | $A_6$ | $A_8$ | $A_{10}$ |
|---|---|---|---|---|---|
| 5 | 0 | −1.42042E−05 | −1.88305E−06 | 5.09450E−09 | −8.56261E−10 |
| 6 | 0 | 1.26966E−04 | −3.65682E−06 | 8.65671E−08 | −2.01355E−09 |
| 7 | 0 | −3.00749E−03 | 4.05466E−04 | −2.83892E−05 | 8.29420E−07 |
| 8 | 0 | −3.96463E−03 | 4.67852E−04 | −3.45251E−05 | 1.06167E−06 |
| 12 | 0 | −2.36511E−04 | 7.43299E−07 | 1.93594E−07 | −1.25144E−08 |
| 16 | 0 | −9.92307E−05 | 3.73471E−06 | −5.81173E−08 | 5.31392E−09 |

Figure 2:
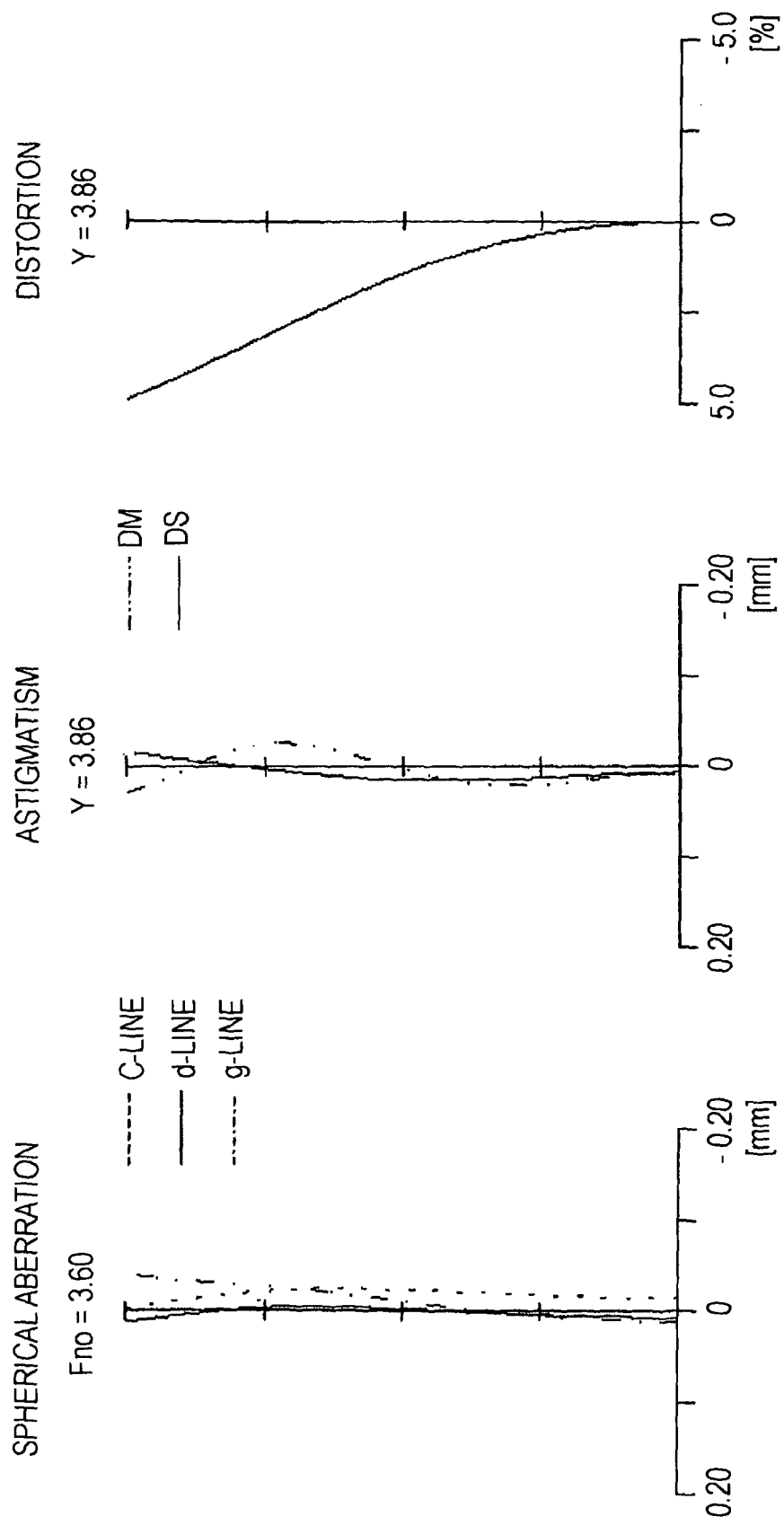
FIG. 2 is a graph showing a spherical aberration, an astigmatism, and a distortion measured at a wide-angle end in the first embodiment.
Figure 3:
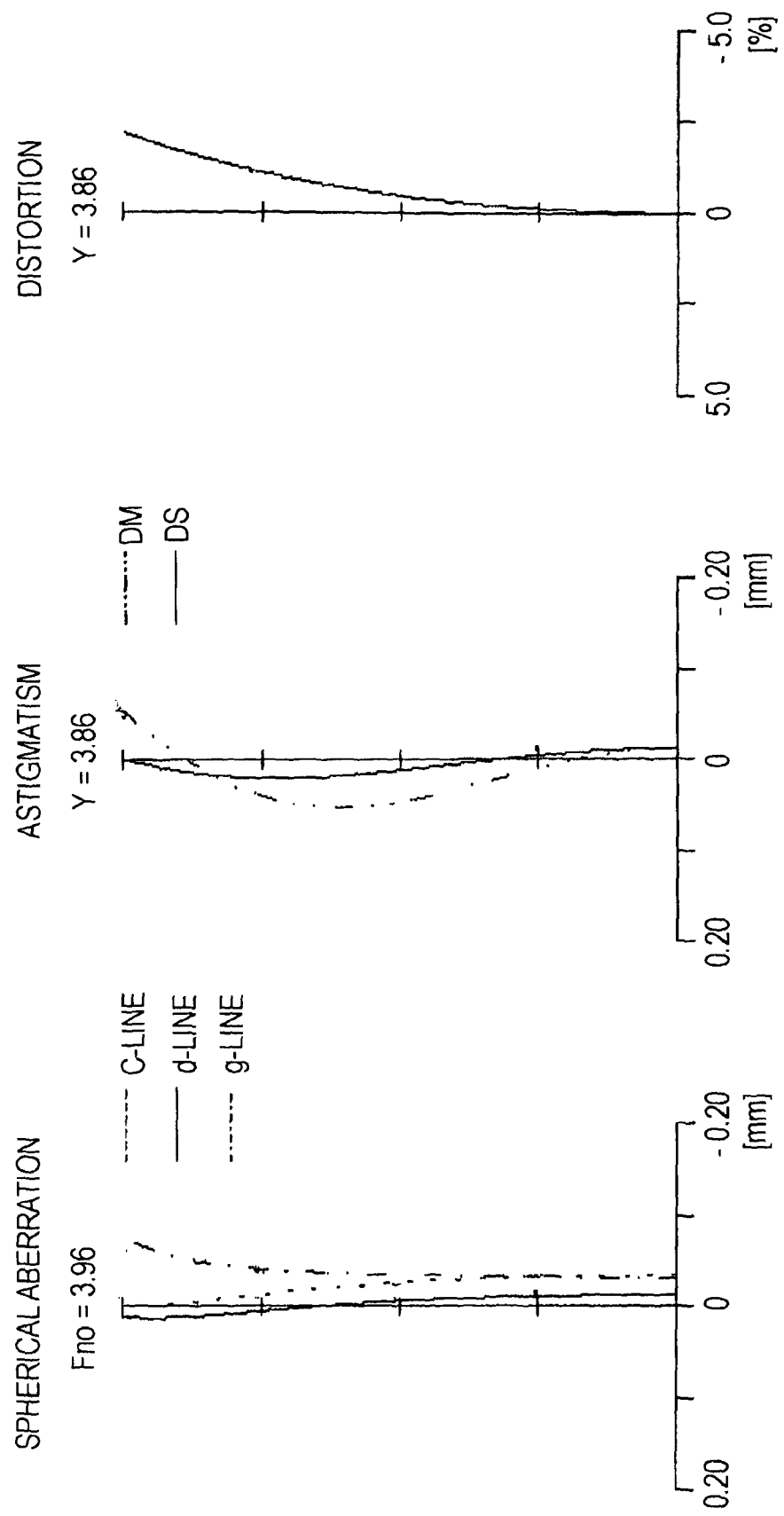
FIG. 3 is a graph showing a spherical aberration, an astigmatism, and a distortion measured at an intermediate focal position between the wide-angle end and a telephoto end in the first embodiment.
Figure 4:
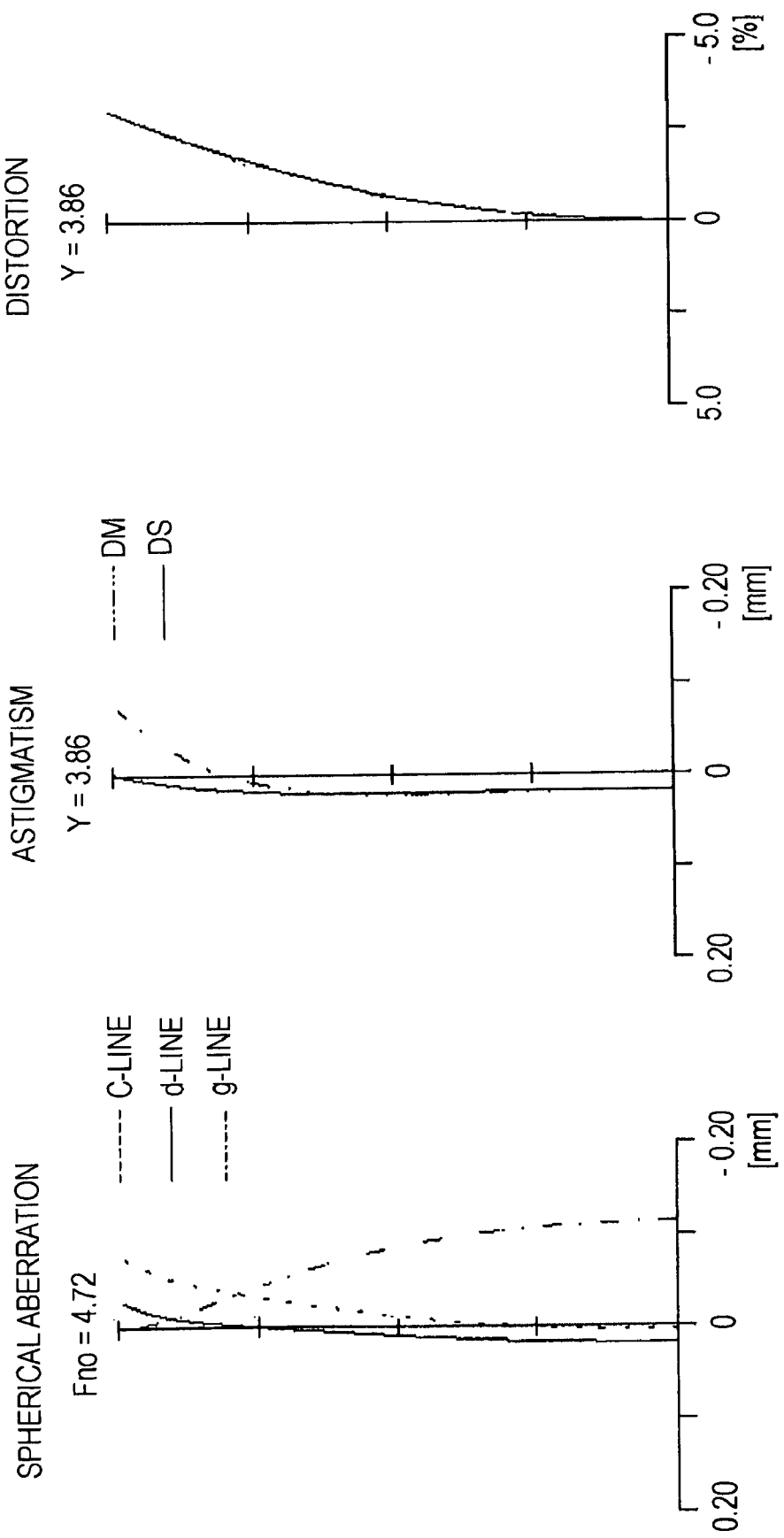
FIG. 4 is a graph showing a spherical aberration, an astigmatism, and a distortion measured at the telephoto end in the first embodiment.

FIGS. 2, 3, and 4 show various aberration graphs in the numerical embodiment 1, measured at the wide-angle end position, the intermediate focal position between the wide-angle end and the telephoto end, and the telephoto end position, respectively. In each of spherical-aberration graphs, an ordinate indicates a ratio to a maximum aperture, an abscissa indicates a defocus value, a solid line represents a spherical aberration at d-line, a dashed line represents a spherical aberration at C-line, and an alternate-long-and-short-dashed line represents a spherical aberration at g-line. In each of astigmatism graphs, an ordinate indicates an image height, an abscissa indicates a focus value, a solid line represents a sagittal image plane, and a dashed line represents a meridional image plane. In each of distortion graphs, an ordinate indicates an image height, and an abscissa indicates a distortion in %.

Second Embodiment

FIG. 5 is a diagram showing the lens construction of a second embodiment of the zoom lens according to the present invention. In the second embodiment, the zoom lens is constructed by arranging, in the following order from the object side, a first lens group GR1 having positive refractive power, a second lens group GR2 having negative refractive power, a third lens group GR3 having positive refractive power, a fourth lens group GR4 having positive refractive power, and a fifth lens group GR5 having negative refractive power.

The first lens group GR1 is constructed of a negative lens G1, a right prism G2 for folding the optical axis at 90°, and a positive lens G3 having both surfaces formed of aspherical surfaces. The second lens group GR2 is constructed of a negative lens G4, a cemented lens formed of a negative lens G5 and a positive lens G6, and a negative lens G7. The third lens group GR3 is constructed of a positive lens G8 having both surfaces formed of aspherical surfaces. The fourth lens group GR4 is constructed of a cemented lens formed of a positive lens G9 and a negative lens G10. The fifth lens group GR5 is constructed of a lens part group FG formed of a negative lens G11, a lens part group SG formed of a positive lens G12, and a lens part group RG formed of a negative lens G13. Image shifting is performed by moving the lens part group SG (blur correcting lens group) in either direction perpendicular to the optical axis.

Furthermore, the first lens group GR1, the third lens group GR3, and the fifth lens group GR5 are fixed during zooming. The second lens group GR2 and the fourth lens group GR4 perform zooming by moving in optical axis directions. The fourth lens group GR4 performs focusing during near-distance imaging by moving in an optical axis direction.

It is noted that in FIG. 5, an LPF is a low-pass filter inserted between the fifth lens group GR5 and an image capture plane IMG. Furthermore, an aperture stop IR is arranged near the image side of the third lens group GR3, and is fixed during zooming.

Table 4 shows optical system data of a numerical embodiment 2 in which specific numerical values are applied to the second embodiment. In the following table, "INFINITY" indicates that the surface is formed of a plane.

TABLE 4

| si | ri | di | ni | νi |
|---|---|---|---|---|
| 1 | r1 = 26.8198 | d1 = 0.600 | n1 = 1.92286 | ν1 = 20.9 |
| 2 | r2 = 9.4077 | d2 = 1.800 | | |
| 3 | r3 = INFINITY | d3 = 8.000 | n3 = 1.90366 | ν3 = 31.3 |
| 4 | r4 = INFINITY | d4 = 0.200 | | |
| 5 | r5 = 12.6509 | d5 = 2.213 | n5 = 1.69350 | ν5 = 53.2 |
| 6 | r6 = −16.6304 | d6 = VARIABLE | | |
| 7 | r7 = −50.0000 | d7 = 0.650 | n7 = 1.85135 | ν7 = 40.1 |
| 8 | r8 = 9.7521 | d8 = 0.604 | | |
| 9 | r9 = −70.9959 | d9 = 0.400 | n9 = 1.83481 | ν9 = 42.7 |
| 10 | r10 = 6.9297 | d10 = 1.454 | n10 = 2.00069 | ν10 = 25.5 |
| 11 | r11 = −47.1812 | d11 = 0.285 | | |
| 12 | r12 = −10.2483 | d12 = 0.400 | n12 = 1.77250 | ν12 = 49.6 |
| 13 | r13 = 15.9066 | d13 = VARIABLE | | |
| 14 | r14 = 10.6338 | d14 = 1.349 | n14 = 1.69350 | ν14 = 53.2 |
| 15 | r15 = −30.2038 | d15 = 0.200 | | |
| 16 | r16 = INFINITY | d16 = 1.500 | | APERTURE STOP |
| 17 | r17 = INFINITY | d17 = VARIABLE | | |
| 18 | r18 = 10.3994 | d18 = 2.500 | n18 = 1.58313 | ν18 = 59.5 |
| 19 | r19 = −5.0461 | d19 = 0.400 | n19 = 1.83400 | ν19 = 37.3 |
| 20 | r20 = −9.5569 | d20 = VARIABLE | | |
| 21 | r21 = 18.3792 | d21 = 0.400 | n21 = 2.00069 | ν21 = 25.5 |
| 22 | r22 = 5.7661 | d22 = 1.698 | | |

TABLE 4-continued

| si | ri | di | ni | vi |
|---|---|---|---|---|
| 23 | r23 = 8.2627 | d23 = 1.780 | n23 = 1.48749 | v23 = 70.4 |
| 24 | r24 = −35.7352 | d24 = 1.226 | | |
| 25 | r25 = −258.2619 | d25 = 0.400 | n25 = 1.83481 | v25 = 42.7 |
| 26 | r26 = 53.7987 | d26 = 6.827 | | |
| 27 | r27 = INFINITY | d27 = 0.000 | n27 = 1.51680 | v27 = 64.2 |
| 28 | r28 = INFINITY | d28 = 0.300 | | |

In the second embodiment, the surface separation d6 between the first lens group GR1 and the second lens group GR2, the surface separation d13 between the second lens group GR2 and the third lens group GR3, the surface separation d17 between the aperture stop IR and the fourth lens group GR4, and the surface separation d20 between the fourth lens group GR4 and the fifth lens group GR5 are variable during zooming. Values of the respective separations d6, d13, d17, and d20 in the numerical embodiment 2 measured at the wide-angle end position, the intermediate focal position between the wide-angle end and the telephoto end, and the telephoto end position are shown in Table 5 along with focal lengths, F-numbers, and half view angles ω.

TABLE 5

| FOCAL LENGTH | 6.50 | 12.32 | 24.00 |
|---|---|---|---|
| Fno | 3.60 | 3.84 | 4.40 |
| ω (degrees) | 31.98 | 17.05 | 8.87 |
| d6 | 0.400 | 4.253 | 7.086 |
| d13 | 7.086 | 3.233 | 0.400 |
| d17 | 5.297 | 3.052 | 0.661 |
| d20 | 0.629 | 2.874 | 5.265 |

In the second embodiment, both surfaces s5, s6 of the positive lens G3 in the first lens group GR1, both surfaces s7, s8 of the negative lens G4 in the second lens group GR2, the object-side surface s14 of the positive lens G8 in the third lens group GR3, and the object-side surface s18 of the cemented lens in the fourth lens group GR4 are formed of aspherical surfaces. The 4th-, 6th-, 8th-, and 10th-order aspherical coefficients of these surfaces s5, s6, s7, s8, s14, and s18 in the numerical embodiment 2 are shown in Table 6 along with cone constants K.

TABLE 6

| si | K | $A_4$ | $A_6$ | $A_8$ | $A_{10}$ |
|---|---|---|---|---|---|
| 5 | 0 | −4.85260E−05 | −1.31596E−06 | 4.96804E−08 | −6.24368E−09 |
| 6 | 0 | 8.30781E−05 | −1.20274E−06 | 7.32889E−09 | −4.62025E−09 |
| 7 | 0 | 2.86102E−04 | −3.13461E−05 | 4.84557E−06 | −2.36061E−07 |
| 8 | 0 | 3.41876E−05 | −3.84078E−05 | 9.03163E−06 | −5.68727E−07 |
| 14 | 0 | −2.79028E−04 | −9.51405E−07 | 3.27483E−07 | −1.82879E−08 |
| 18 | 0 | −2.63692E−04 | 6.64269E−06 | 7.00488E−08 | 1.05192E−08 |

Figure 6:
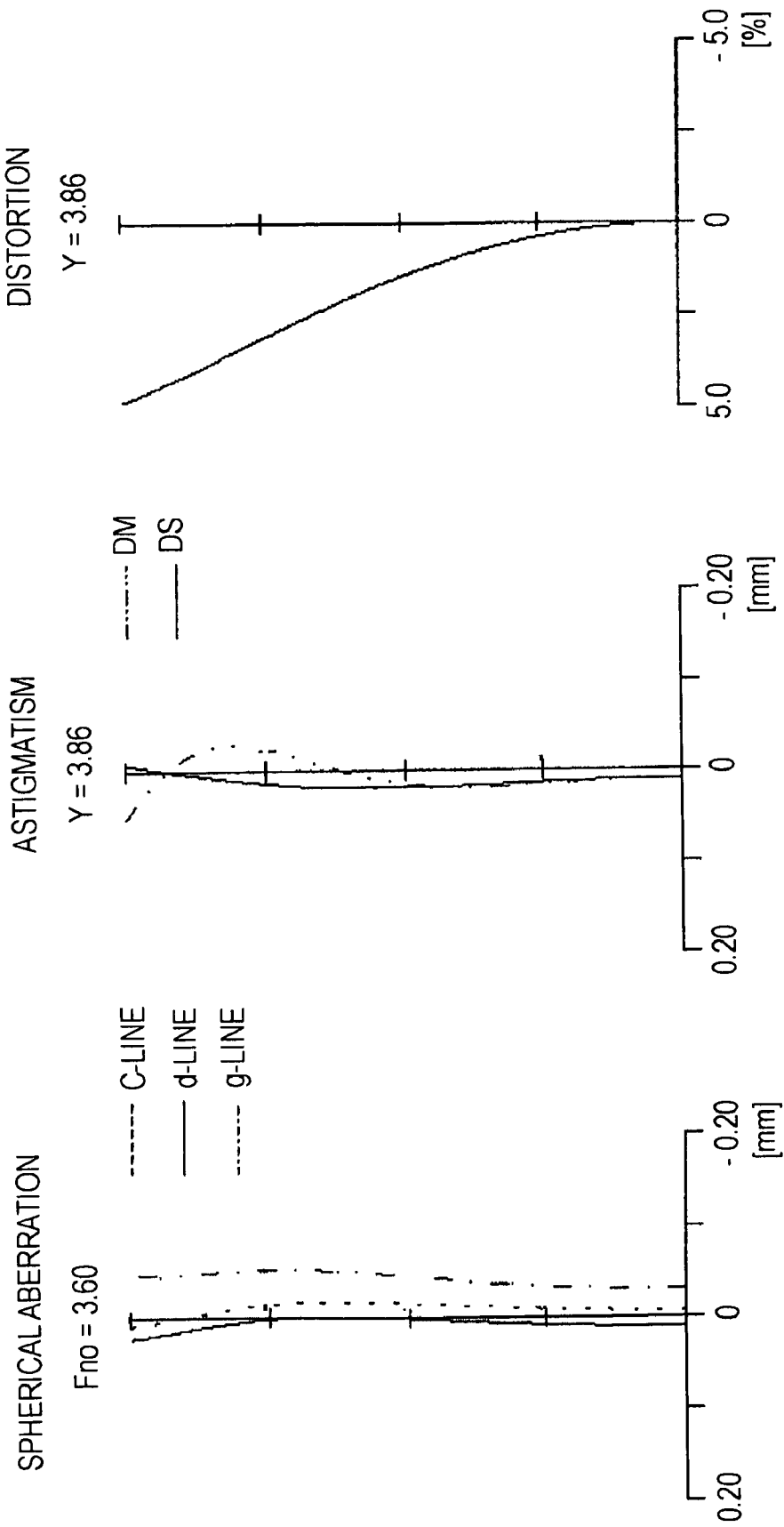
FIG. 6 is a graph showing a spherical aberration, an astigmatism, and a distortion measured at the wide-angle end in the second embodiment.
Figure 7:
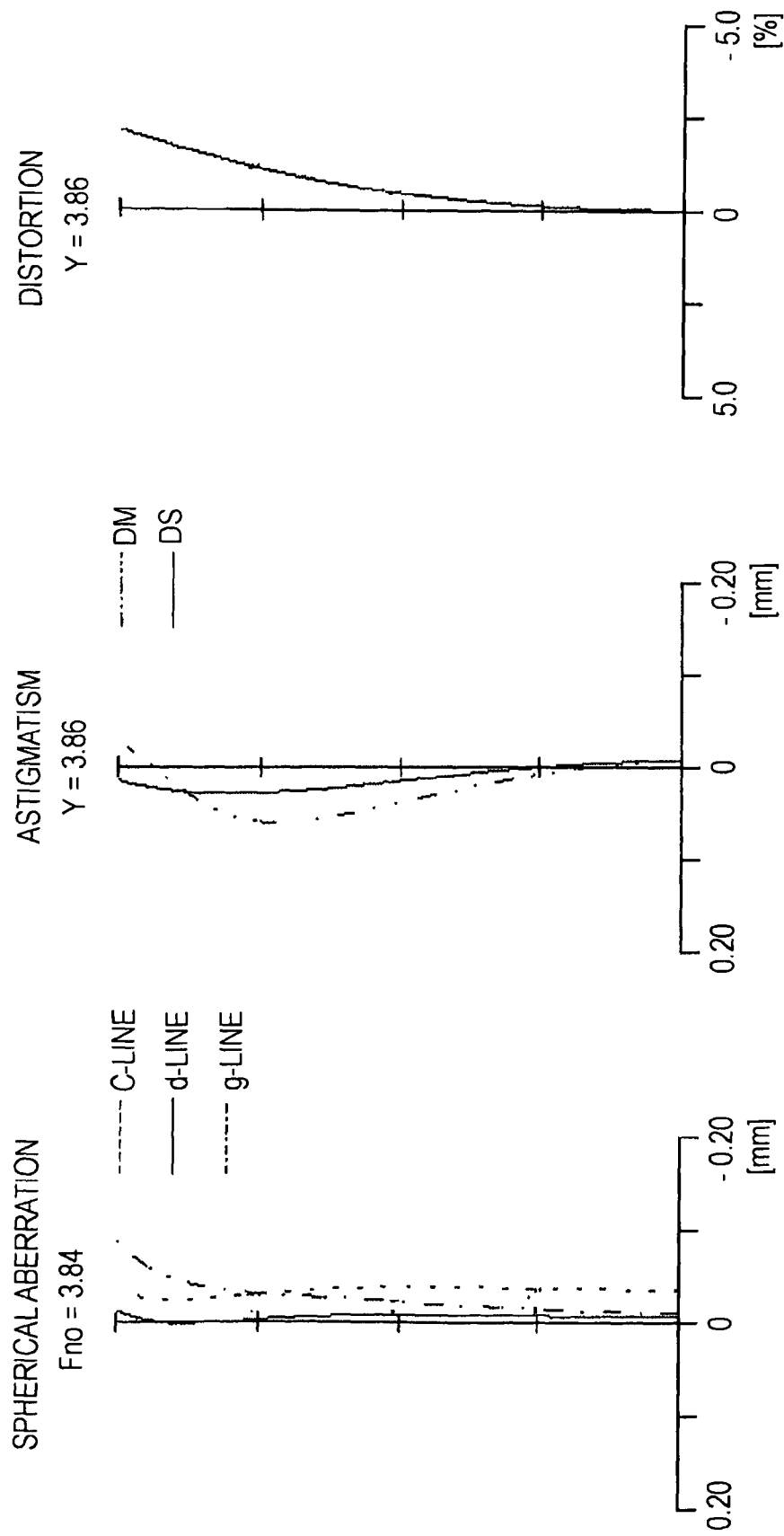
FIG. 7 is a graph showing a spherical aberration, an astigmatism, and a distortion measured at the intermediate focal position between the wide-angle end and the telephoto end in the second embodiment.
Figure 8:
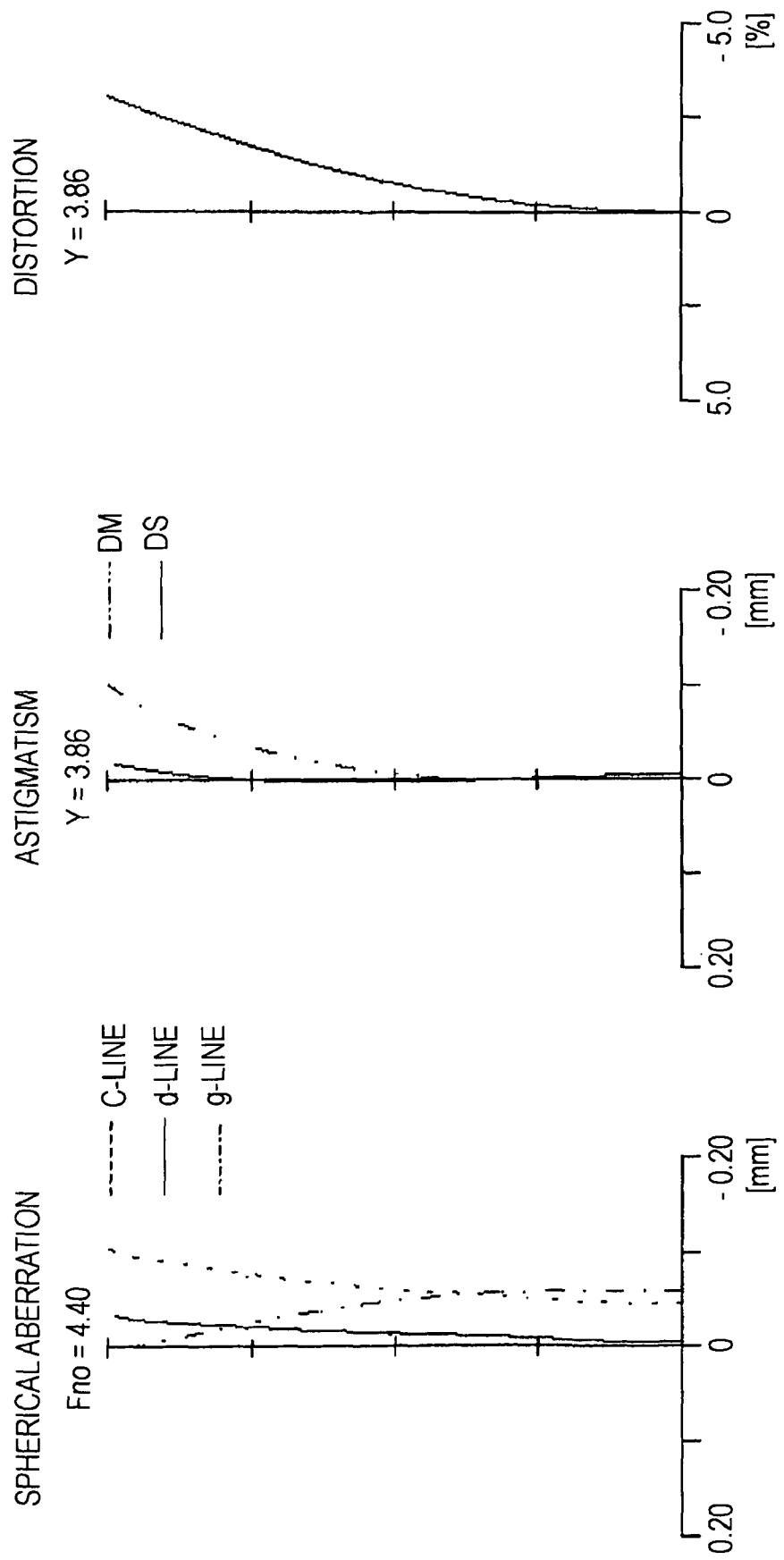
FIG. 8 is a graph showing a spherical aberration, an astigmatism, and a distortion measured at the telephoto end in the second embodiment.

FIGS. 6, 7, and 8 show various aberration graphs in the numerical embodiment 2, measured at the wide-angle end position, the intermediate focal position between the wide-angle end and the telephoto end, and the telephoto end position, respectively. In each of spherical-aberration graphs, an ordinate indicates a ratio to a maximum aperture, an abscissa indicates a defocus value, a solid line represents a spherical aberration at d-line, a dashed line represents a spherical aberration at C-line, and an alternate-long-and-short-dashed line represents a spherical aberration at g-line. In each of astigmatism graphs, an ordinate indicates an image height, an abscissa indicates a focus value, a solid line represents a sagittal image plane, and a dashed line represents a meridional image plane. In each of distortion graphs, an ordinate indicates an image height, and an abscissa indicates a distortion in %.

Third Embodiment

FIG. 9 is a diagram showing the lens construction of a third embodiment of the zoom lens according to the present invention. In the third embodiment, the zoom lens is constructed by arranging, in the following order from the object side, a first lens group GR1 having positive refractive power, a second lens group GR2 having negative refractive power, a third lens group GR3 having positive refractive power, a fourth lens group GR4 having positive refractive power, a fifth lens group GR5 having negative refractive power, and a sixth lens group GR6 having positive refractive power.

The first lens group GR1 is constructed of a negative lens G1, a right prism G2 for folding the optical axis at 90°, a positive lens G3 having both surfaces formed of aspherical surfaces, and a positive lens G4. The second lens group GR2 is constructed of a negative lens G5, a cemented lens formed of a negative lens G6 and a positive lens G7, and a negative lens G8. The third lens group GR3 is constructed of a positive lens G9 having both surfaces formed of aspherical surfaces. The fourth lens group GR4 is constructed of a cemented lens formed of a positive lens G10 and a negative lens G11. The fifth lens group GR5 is constructed of a lens part group FG formed of a negative lens G12. The sixth lens group GR6 is constructed of a lens part group SG formed of a cemented lens formed of a positive lens G13 and a negative lens G14, and a lens part group RG formed of a negative lens G15. Image shifting is performed by moving the lens part group SG (blur correcting lens group) in either direction perpendicular to the optical axis.

Furthermore, the first lens group GR1, the third lens group GR3, and the sixth lens group GR6 are fixed during zooming. The second lens group GR2, the fourth lens group GR4, and the fifth lens group GR5 perform zooming by moving in optical axis directions. The fourth lens group GR4 or the fifth lens group GR5 performs focusing during near-distance imaging by moving in an optical axis direction.

It is noted that in FIG. 9, an LPF is a low-pass filter inserted between the sixth lens group GR6 and an image capture plane IMG. Furthermore, an aperture stop IR is arranged near the image side of the third lens group GR3, and is fixed during zooming.

Table 7 shows optical system data of a numerical embodiment 3 in which specific numerical values are applied to the third embodiment. In the following table, "INFINITY" indicates that the surface is formed of a plane.

TABLE 7

| si | ri | di | ni | vi |
|---|---|---|---|---|
| 1 | r1 = 43.7149 | d1 = 0.600 | n1 = 1.92286 | v1 = 20.9 |
| 2 | r2 = 13.6975 | d2 = 2.400 | | |
| 3 | r3 = INFINITY | d3 = 10.500 | n3 = 2.00069 | v3 = 25.5 |
| 4 | r4 = INFINITY | d4 = 0.200 | | |
| 5 | r5 = 27.3914 | d5 = 2.357 | n5 = 1.49700 | v5 = 81.6 |
| 6 | r6 = −30.1302 | d6 = 0.200 | | |
| 7 | r7 = 22.4954 | d7 = 2.136 | n7 = 1.82080 | v7 = 42.7 |
| 8 | r8 = −141.5295 | d8 = VARIABLE | | |
| 9 | r9 = 48.0000 | d9 = 0.650 | n9 = 1.85135 | v9 = 40.1 |
| 10 | r10 = 7.1855 | d10 = 1.901 | | |
| 11 | r11 = −12.5461 | d11 = 0.765 | n11 = 1.83481 | v11 = 42.7 |
| 12 | r12 = 12.8066 | d12 = 1.572 | n12 = 1.92286 | v12 = 20.9 |
| 13 | r13 = −17.5048 | d13 = 0.252 | | |
| 14 | r14 = −10.3716 | d14 = 0.755 | n14 = 1.88300 | v14 = 40.8 |
| 15 | r15 = −101.0233 | d15 = VARIABLE | | |
| 16 | r16 = 13.6549 | d16 = 1.516 | n16 = 1.61881 | v16 = 63.9 |
| 17 | r17 = −24.0589 | d17 = 0.200 | | |
| 18 | r18 = INFINITY | d18 = 1.500 | | APERTURE STOP |
| 19 | r19 = INFINITY | d19 = VARIABLE | | |
| 20 | r20 = 16.9864 | d20 = 2.278 | n20 = 1.58313 | v20 = 59.5 |
| 21 | r21 = −6.8237 | d21 = 0.400 | n21 = 1.80610 | v21 = 33.3 |

TABLE 7-continued

| si | ri | di | ni | vi |
|---|---|---|---|---|
| 22 | r22 = −13.0972 | d22 = VARIABLE | | |
| 23 | r23 = 24.0096 | d23 = 0.400 | n23 = 1.90366 | v23 = 31.3 |
| 24 | r24 = 7.3787 | d24 = VARIABLE | | |
| 25 | r25 = 10.8706 | d25 = 2.574 | n25 = 1.48749 | v25 = 70.4 |
| 26 | r26 = −10.6551 | d26 = 0.400 | n26 = 1.84666 | v26 = 23.8 |
| 27 | r27 = −14.5320 | d27 = 0.900 | | |
| 28 | r28 = −23.8103 | d28 = 0.400 | n28 = 1.80610 | v28 = 33.3 |
| 29 | r29 = −73.6595 | d29 = 8.062 | | |
| 30 | r30 = INFINITY | d30 = 0.300 | n30 = 1.51680 | v30 = 64.2 |
| 31 | r31 = INFINITY | d31= | | |

In the third embodiment, the surface separation d8 between the first lens group GR1 and the second lens group GR2, the surface separation d15 between the second lens group GR2 and the third lens group GR3, the surface separation d19 between the aperture stop IR and the fourth lens group GR4, the surface separation d22 between the fourth lens group GR4 and the fifth lens group GR5, and the surface separation d24 between the fifth lens group GR5 and the sixth lens group GR6 are variable during zooming. Values of the respective separations d8, d15, d19, d22, and d24 in the numerical embodiment 3 measured at the wide-angle end position, the intermediate focal position between the wide-angle end and the telephoto end, and the telephoto end position are shown in Table 8 along with focal lengths, F-numbers, and half view angles ω.

TABLE 8

| | | | |
|---|---|---|---|
| FOCAL LENGTH | 5.90 | 15.01 | 38.35 |
| Fno | 3.60 | 3.88 | 4.49 |
| ω (degrees) | 34.53 | 14.09 | 5.69 |
| d8 | 0.405 | 7.128 | 11.639 |
| d15 | 11.634 | 4.911 | 0.400 |
| d19 | 8.571 | 4.278 | 0.887 |
| d22 | 0.602 | 4.627 | 6.475 |
| d24 | 3.321 | 3.589 | 5.132 |

In the third embodiment, both surfaces s7, s8 of the positive lens G4 in the first lens group GR1, both surfaces s9, s10 of the negative lens G5 in the second lens group GR2, both surfaces s16, s17 of the positive lens G9 in the third lens group GR3, and the object-side surface s20 of the cemented lens in the fourth lens group GR4 are formed of aspherical surfaces. The 4th-, 6th-, 8th-, and 10th-order aspherical coefficients of these surfaces s7, s8, s9, s10, s16, s17, and s20 in the numerical embodiment 3 are shown in Table 9 along with cone constants K.

TABLE 9

| si | K | $A_4$ | $A_6$ | $A_8$ | $A_{10}$ |
|---|---|---|---|---|---|
| 7 | 0 | −2.59075E−05 | −2.51774E−07 | −1.49729E−09 | −2.51016E−11 |
| 8 | 0 | −3.06037E−05 | −2.17270E−07 | −7.77960E−10 | −1.60777E−11 |
| 9 | 0 | 1.45633E−04 | −4.28229E−07 | −3.29898E−07 | 9.48712E−09 |
| 10 | 0 | 1.00577E−04 | 9.26674E−06 | −9.74615E−07 | 1.87934E−08 |
| 16 | 0 | −8.92383E−06 | 1.32511E−05 | −5.23495E−07 | 4.72708E−08 |
| 17 | 0 | 1.65261E−04 | 1.20884E−05 | −4.19449E−07 | 4.72599E−08 |
| 20 | 0 | −8.65661E−05 | 1.86235E−06 | −3.39148E−08 | 1.15689E−09 |

Figure 10:
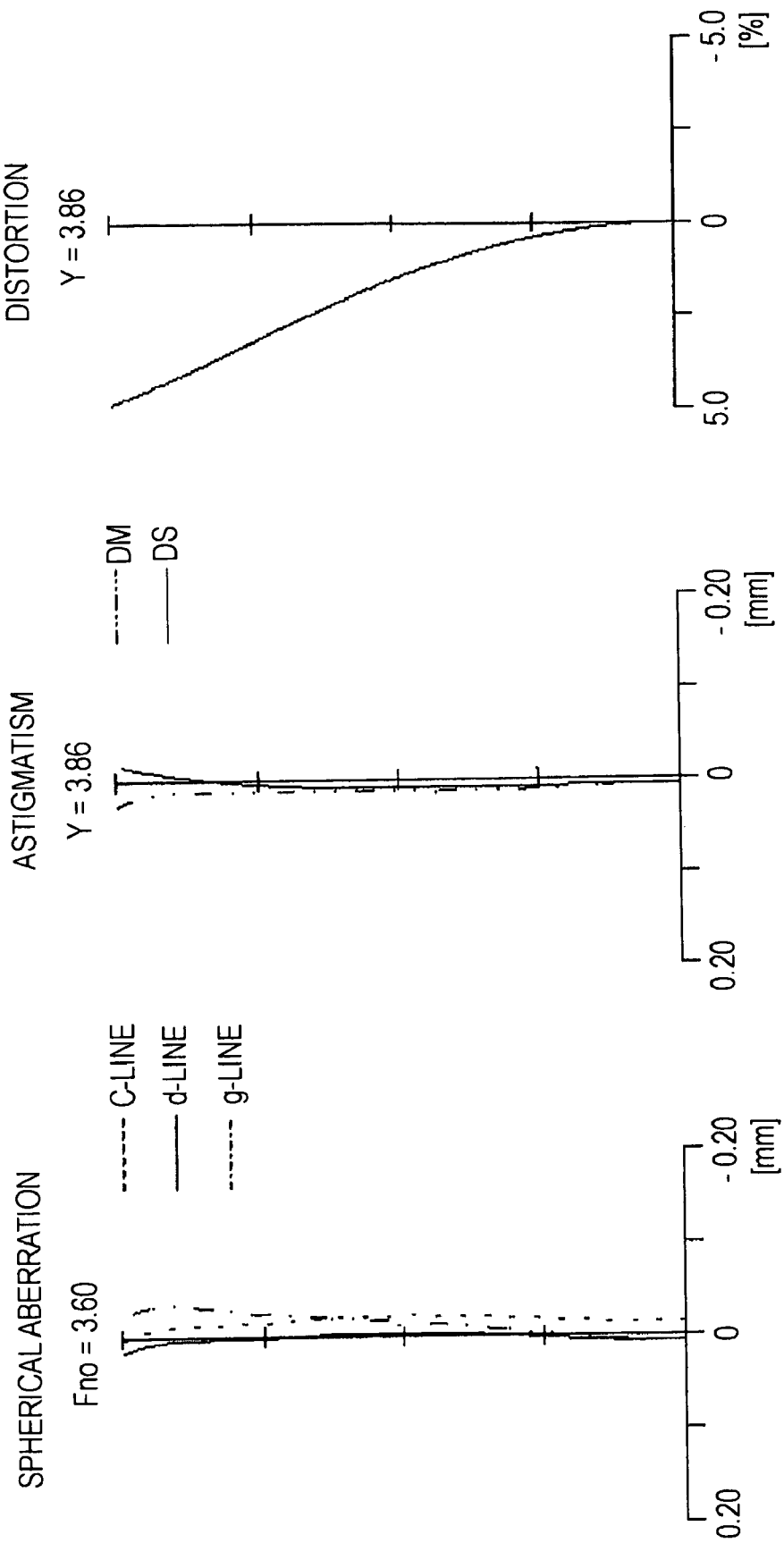
FIG. 10 is a graph showing a spherical aberration, an astigmatism, and a distortion measured at the wide-angle end in the third embodiment.
Figure 11:
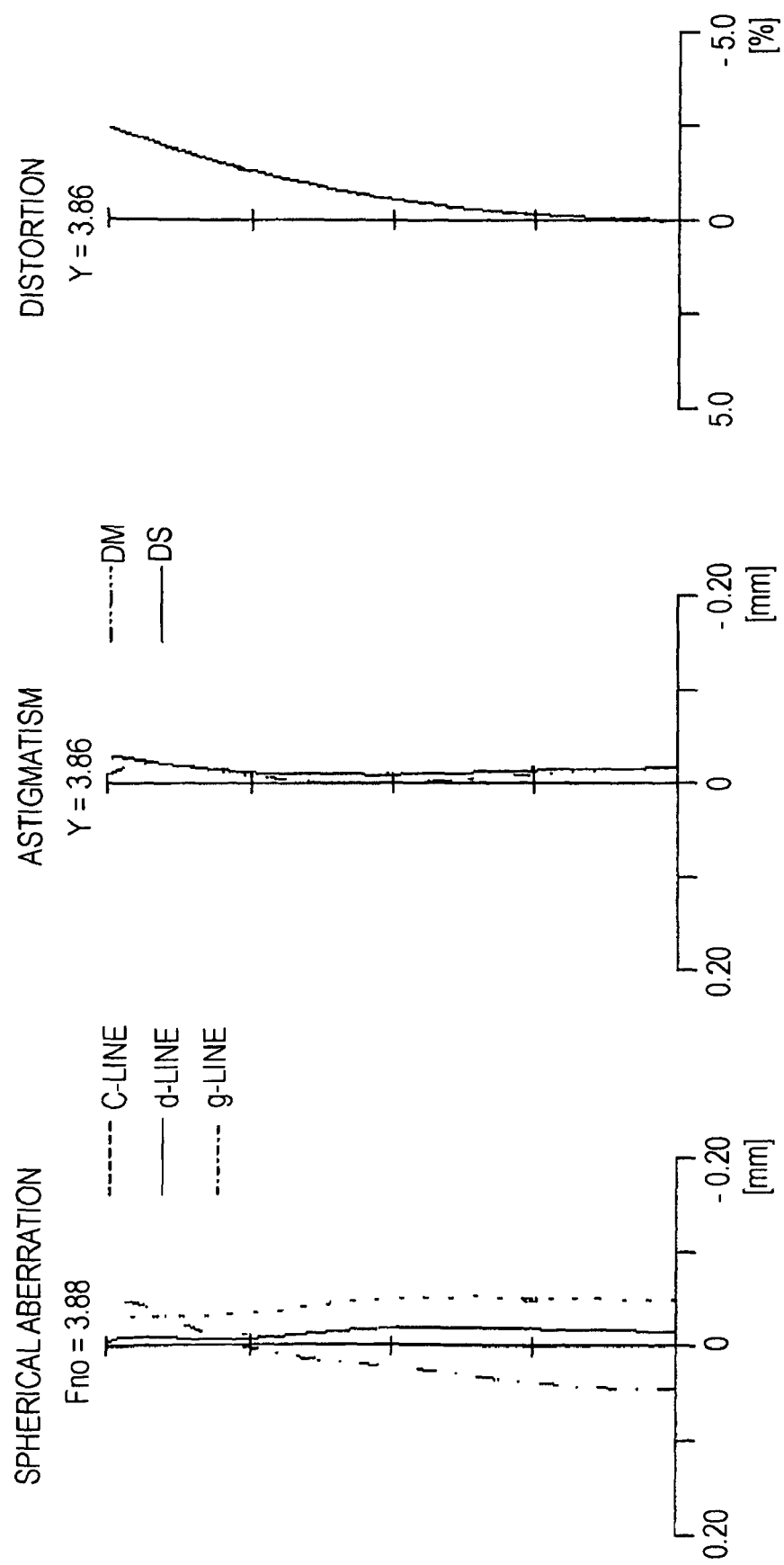
FIG. 11 is a graph showing a spherical aberration, an astigmatism, and a distortion measured at the intermediate focal position between the wide-angle end and the telephoto end in the third embodiment.
Figure 12:
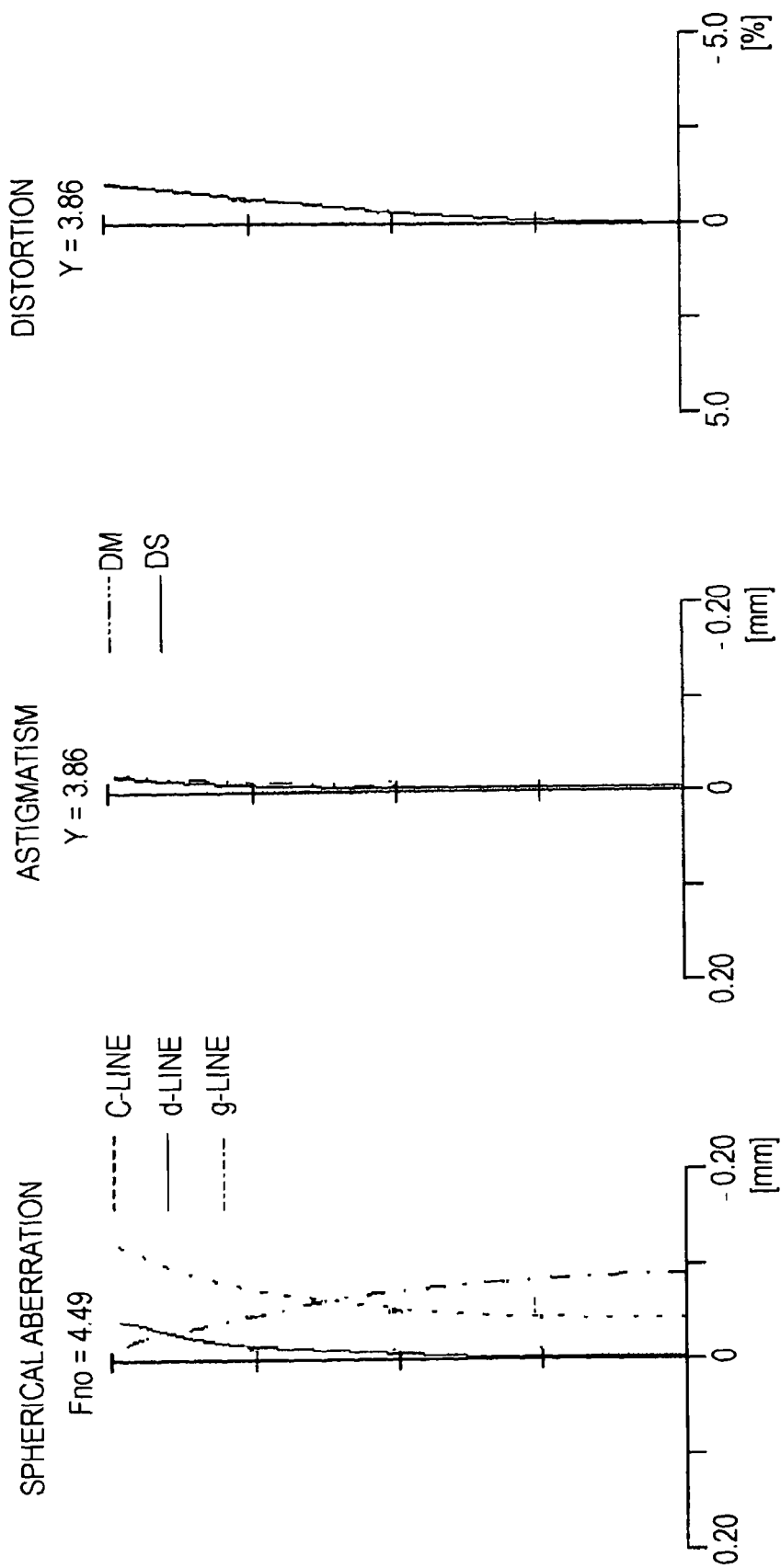
FIG. 12 is a graph showing a spherical aberration, an astigmatism, and a distortion measured at the telephoto end in the third embodiment.

FIGS. 10, 11, and 12 show various aberration graphs in the numerical embodiment 3, measured at the wide-angle end position, the intermediate focal position between the wide-angle end and the telephoto end, and the telephoto end position, respectively. In each of spherical-aberration graphs, an ordinate indicates a ratio to a maximum aperture, an abscissa indicates a defocus value, a solid line represents a spherical aberration at d-line, a dashed line represents a spherical aberration at C-line, and an alternate-long-and-short-dashed line represents a spherical aberration at g-line. In each of astigmatism graphs, an ordinate indicates an image height, an abscissa indicates a focus value, a solid line represents a sagittal image plane, and a dashed line represents a meridional image plane. In each of distortion graphs, an ordinate indicates an image height, and an abscissa indicates a distortion in %.

Fourth Embodiment

FIG. 13 is a diagram showing the lens construction of a fourth embodiment of the zoom lens according to the present invention. In the fourth embodiment, the zoom lens is constructed by arranging, in the following order from the object side, a first lens group GR1 having positive refractive power, a second lens group GR2 having negative refractive power, a third lens group GR3 having positive refractive power, a fourth lens group GR4 having positive refractive power, and a fifth lens group GR5 having negative refractive power.

The first lens group GR1 is constructed of a negative lens G1, a right prism G2 for folding the optical axis at 90°, and a positive lens G3 having both surfaces formed of aspherical surfaces. The second lens group GR2 is constructed of a negative lens G4, and a cemented lens formed of a negative lens G5 and a positive lens G6. The third lens group GR3 is constructed of a positive lens G7 having both surfaces formed of aspherical surfaces. The fourth lens group GR4 is constructed of a cemented lens formed of a positive lens G8 and a negative lens G9. The fifth lens group GR5 is constructed of a lens part group FG formed of a negative lens G10, a lens part group SG formed of a positive lens G11, and a lens part group RG formed of a negative lens G12. Image shifting is performed by moving the lens part group SG (blur correcting lens group) in either direction perpendicular to the optical axis.

Furthermore, the first lens group GR1, the third lens group GR3, and the fifth lens group GR5 are fixed during zooming. The second lens group GR2 and the fourth lens group GR4 perform zooming by moving in optical axis directions. The fourth lens group GR4 performs focusing during near-distance imaging by moving in an optical axis direction.

It is noted that in FIG. 13, an LPF is a low-pass filter inserted between the fifth lens group GR5 and an image capture plane IMG. Furthermore, an aperture stop IR is arranged near the image side of the third lens group GR3, and is fixed during zooming.

Table 10 shows optical system data of a numerical embodiment 4 in which specific numerical values are applied to the second embodiment. In the following table, "INFINITY" indicates that the surface is formed of a plane.

TABLE 10

| si | ri | di | ni | vi |
|---|---|---|---|---|
| 1 | r1 = 23.3250 | d1 = 0.600 | n1 = 1.92286 | v1 = 20.9 |
| 2 | r2 = 9.4077 | d2 = 1.800 | | |
| 3 | r3 = INFINITY | d3 = 7.800 | n3 = 1.90366 | v3 = 31.3 |
| 4 | r4 = INFINITY | d4 = 0.200 | | |
| 5 | r5 = 12.2587 | d5 = 2.167 | n5 = 1.69350 | v5 = 53.2 |
| 6 | r6 = −17.0405 | d6 = VARIABLE | | |
| 7 | r7 = −50.0000 | d7 = 0.650 | n7 = 1.85135 | v7 = 40.1 |
| 8 | r8 = 5.8400 | d8 = 0.808 | | |
| 9 | r9 = −27.1340 | d9 = 0.400 | n9 = 1.78590 | v9 = 43.9 |
| 10 | r10 = 6.5131 | d10 = 1.362 | n10 = 1.92286 | v10 = 20.9 |
| 11 | r11 = 31.0498 | d11 = VARIABLE | | |
| 12 | r12 = 12.1459 | d12 = 1.300 | n12 = 1.69350 | v12 = 53.2 |
| 13 | r13 = −38.2878 | d13 = 0.200 | | |

TABLE 10-continued

| si | ri | di | ni | vi |
|---|---|---|---|---|
| 14 | r14 = INFINITY | d14 = 1.500 | | APERTURE STOP |
| 15 | r15 = INFINITY | d15 = VARIABLE | | |
| 16 | r16 = 13.8816 | d16 = 2.500 | n16 = 1.58313 | v16 = 59.5 |
| 17 | r17 = −5.6425 | d17 = 0.400 | n17 = 1.90366 | v17 = 31.3 |
| 18 | r18 = −9.9494 | d18 = VARIABLE | | |
| 19 | r19 = 11.5986 | d19 = 0.400 | n19 = 2.00069 | v19 = 25.5 |
| 20 | r20 = 5.8790 | d20 = 1.700 | | |
| 21 | r21 = 7.7715 | d21 = 1.657 | n21 = 1.48749 | v21 = 70.4 |
| 22 | r22 = INFINITY | d22 = 0.500 | | |
| 23 | r23 = −141.5348 | d23 = 0.400 | n23 = 1.69350 | v23 = 53.3 |
| 24 | r24 = 76.9597 | d24 = 7.199 | | |
| 25 | r25 = INFINITY | d25 = 0.300 | n25 = 1.51680 | v25 = 64.2 |
| 26 | r26 = INFINITY | d26= | | |

In the fourth embodiment, the surface separation d6 between the first lens group GR1 and the second lens group GR2, the surface separation d11 between the second lens group GR2 and the third lens group GR3, the surface separation d15 between the aperture stop IR and the fourth lens group GR4, and the surface separation d18 between the fourth lens group GR4 and the fifth lens group GR5 are variable during zooming. Values of the respective separations d6, d11, d15, and d18 in the numerical embodiment 4 measured at the wide-angle end position, the intermediate focal position between the wide-angle end and the telephoto end, and the telephoto end position are shown in Table 11 along with focal lengths, F-numbers, and half view angles ω.

TABLE 11

| FOCAL LENGTH | 6.50 | 12.32 | 24.00 |
|---|---|---|---|
| Fno | 3.60 | 3.93 | 4.67 |
| ω (degrees) | 31.98 | 17.03 | 8.87 |
| d6 | 0.400 | 4.058 | 6.717 |
| d11 | 6.717 | 3.059 | 0.400 |
| d15 | 7.298 | 4.239 | 0.978 |
| d18 | 2.243 | 5.302 | 8.563 |

In the fourth embodiment, both surfaces s5, s6 of the positive lens G3 in the first lens group GR1, both surfaces s7, s8 of the negative lens G4 in the second lens group GR2, the object-side surface s12 of the positive lens G7 in the third lens group GR3, and the object-side surface s16 of the cemented lens in the fourth lens group GR4 are formed of aspherical surfaces. The 4th-, 6th-, 8th-, and 10th-order aspherical coefficients of these surfaces s5, s6, s7, s8, s12, and s16 in the numerical embodiment 4 are shown in Table 12 along with cone constants K.

TABLE 12

| si | K | $A_4$ | $A_6$ | $A_8$ | $A_{10}$ |
|---|---|---|---|---|---|
| 5 | 0 | −8.81366E−06 | −2.08227E−06 | 1.38822E−08 | −2.65413E−09 |
| 6 | 0 | 1.42857E−04 | −3.94657E−06 | 7.85488E−08 | −3.16922E−09 |
| 7 | 0 | −3.38605E−03 | 4.44523E−04 | −2.98464E−05 | 8.20574E−07 |
| 8 | 0 | −4.45633E−03 | 5.00197E−04 | −3.29147E−05 | 7.72672E−07 |
| 12 | 0 | −2.28359E−04 | −2.61774E−06 | 8.22831E−07 | −5.07040E−08 |
| 16 | 0 | −9.12436E−05 | 2.89737E−06 | 1.52536E−07 | −1.33221E−09 |

Figure 14:
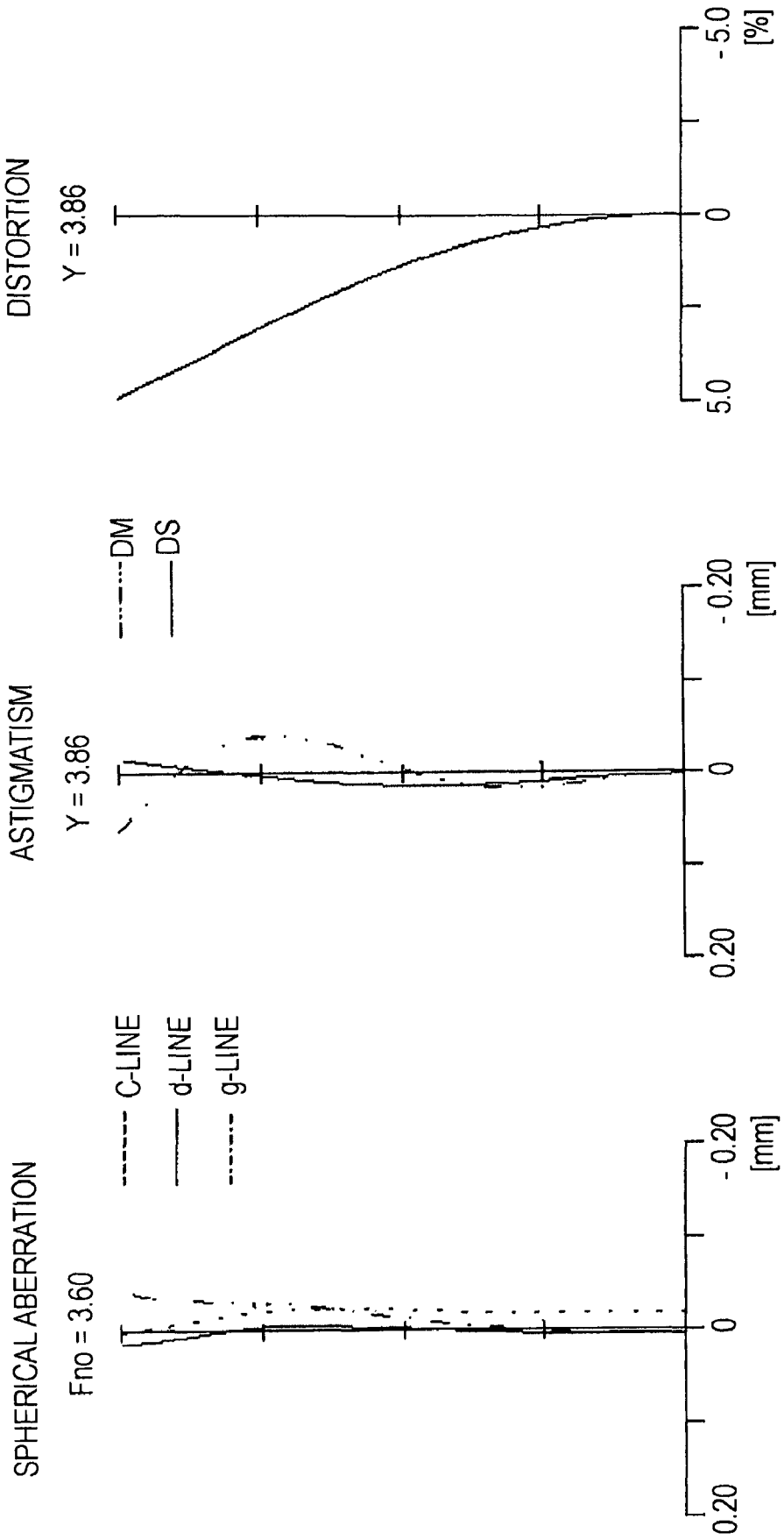
FIG. 14 is a graph showing a spherical aberration, an astigmatism, and a distortion measured at the wide-angle end in the fourth embodiment.
Figure 15:
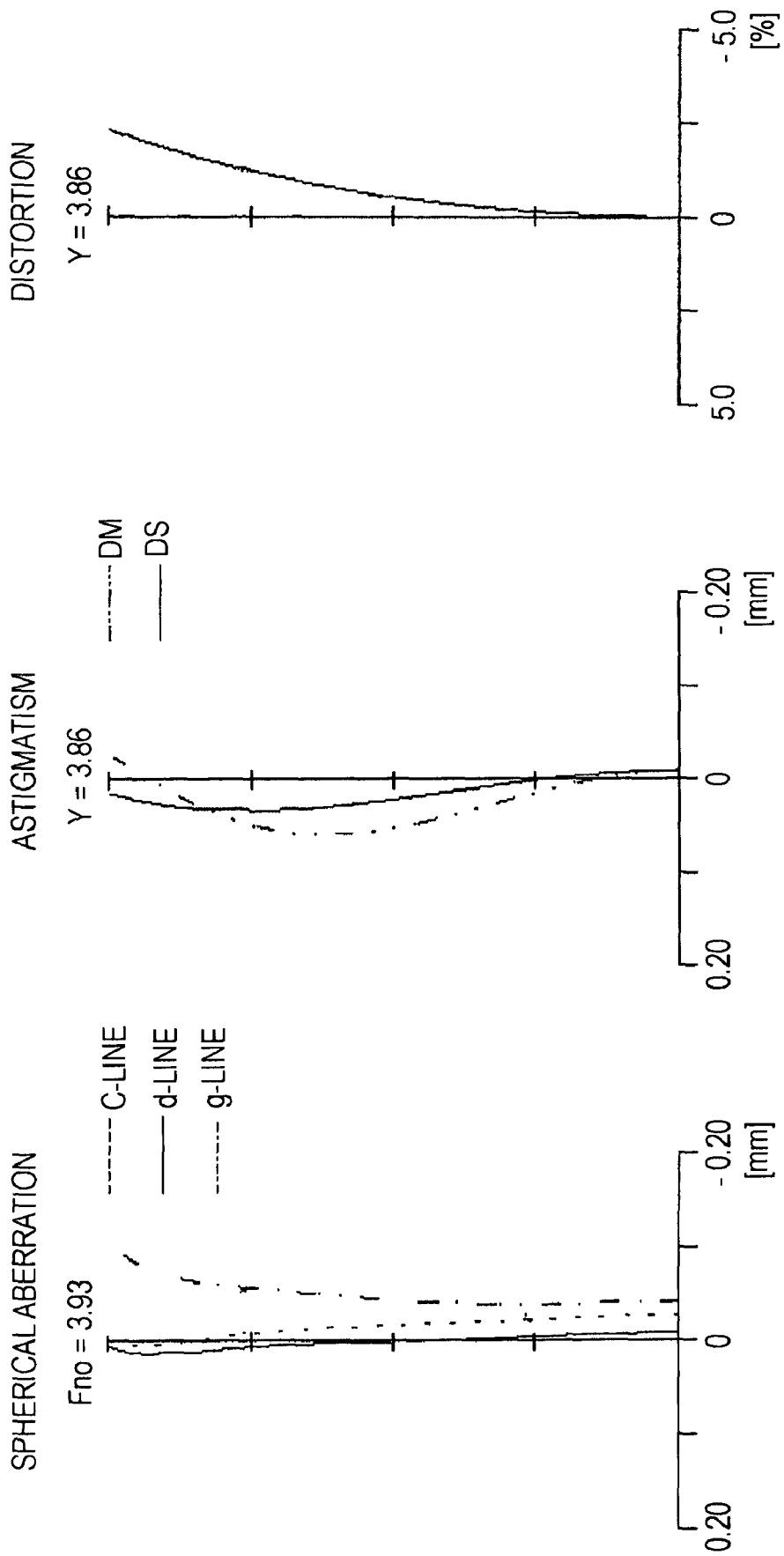
FIG. 15 is a graph showing a spherical aberration, an astigmatism, and a distortion measured at the intermediate focal position between the wide-angle end and the telephoto end in the fourth embodiment.
Figure 16:
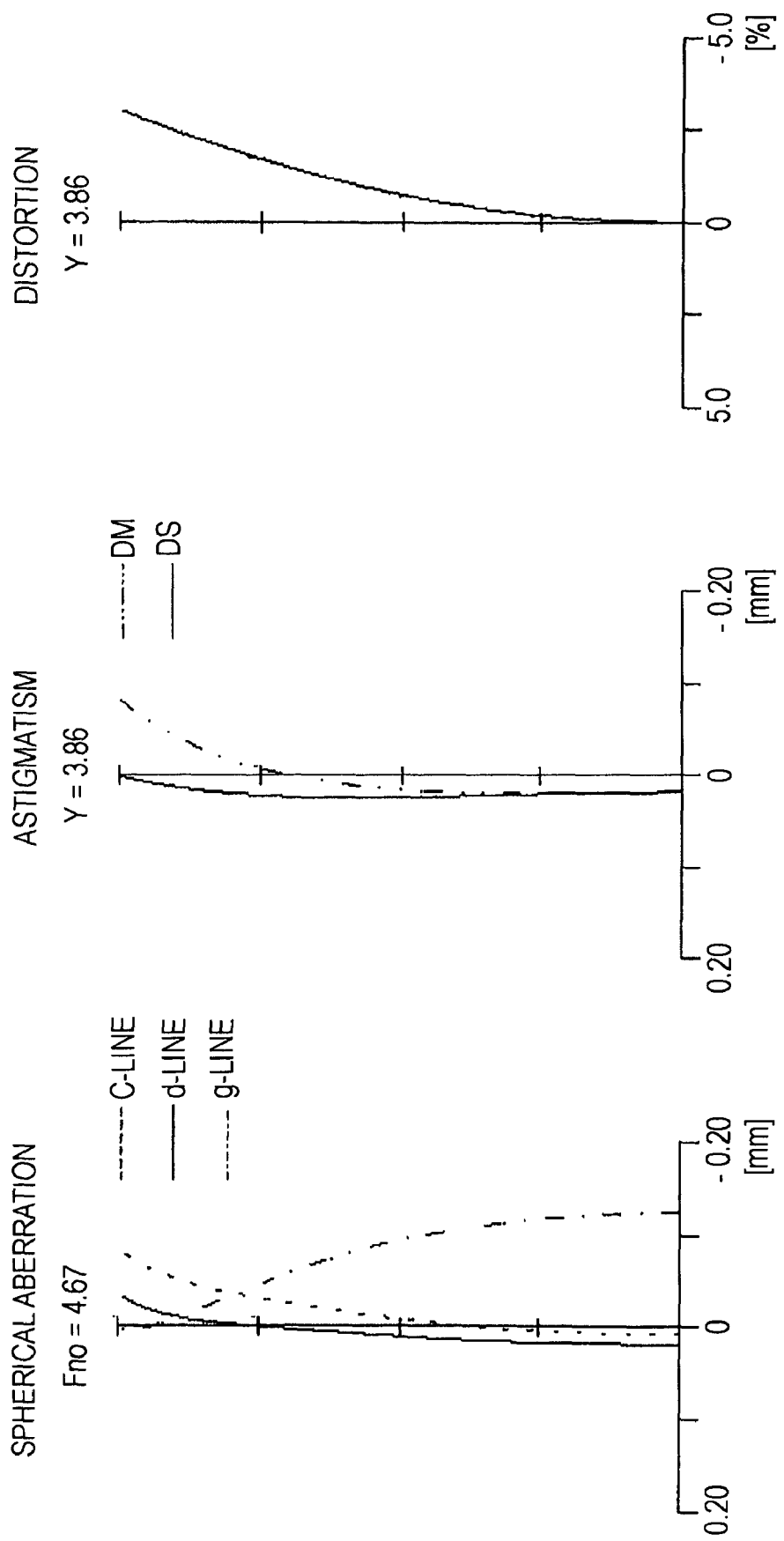
FIG. 16 is a graph showing a spherical aberration, an astigmatism, and a distortion measured at the telephoto end in the fourth embodiment.

FIGS. 14, 15, and 16 show various aberration graphs in the numerical embodiment 4, measured at the wide-angle end position, the intermediate focal position between the wide-angle end and the telephoto end, and the telephoto end position, respectively. In each of spherical-aberration graphs, an ordinate indicates a ratio to a maximum aperture, an abscissa indicates a defocus value, a solid line represents a spherical aberration at d-line, a dashed line represents a spherical aberration at C-line, and an alternate-long-and-short-dashed line represents a spherical aberration at g-line. In each of astigmatism graphs, an ordinate indicates an image height, an abscissa indicates a focus value, a solid line represents a sagittal image plane, and a dashed line represents a meridional image plane. In each of distortion graphs, an ordinate indicates an image height, and an abscissa indicates a distortion in %.

<Numerical Embodiments of the Conditional Formulae>

Values corresponding to the above conditional formulae in the respective numerical embodiments 1-4 are shown in Table 13.

TABLE 13

| CONDITIONAL FORMULA | NUMERICAL EMBODIMENT 1 | NUMERICAL EMBODIMENT 2 | NUMERICAL EMBODIMENT 3 | NUMERICAL EMBODIMENT 4 |
|---|---|---|---|---|
| (1) fs/fr | −0.618 | −0.262 | −0.341 | −0.222 |
| (2) $(1 - \beta s) \times \beta r$ | 0.850 | 0.850 | 0.880 | 0.720 |
| (3) $D_{SR}$/fw | 0.115 | 0.186 | 0.153 | 0.077 |

As is apparent from Table 13 shown above that the zoom lenses according to the above numeral embodiments 1-4 satisfy the conditional formulae (1), (2), and (3). Furthermore, as shown in the respective aberration graphs, it is understood that the respective aberrations are corrected in good balance at the wide-angle end position, the intermediate focal position between the wide-angle end and the telephoto end, and the telephoto end position.

It is noted that the specific structures and shapes, as well as the numerical values that have been referred to in the above description of the embodiments and the numeral embodiments are provided merely as one example for illustrative purposes for ease of understanding of the various embodiments for carrying out the present invention, and these are not to be construed as limiting the technical scope of the present invention.

<Image Capture Apparatus>

Figure 17:
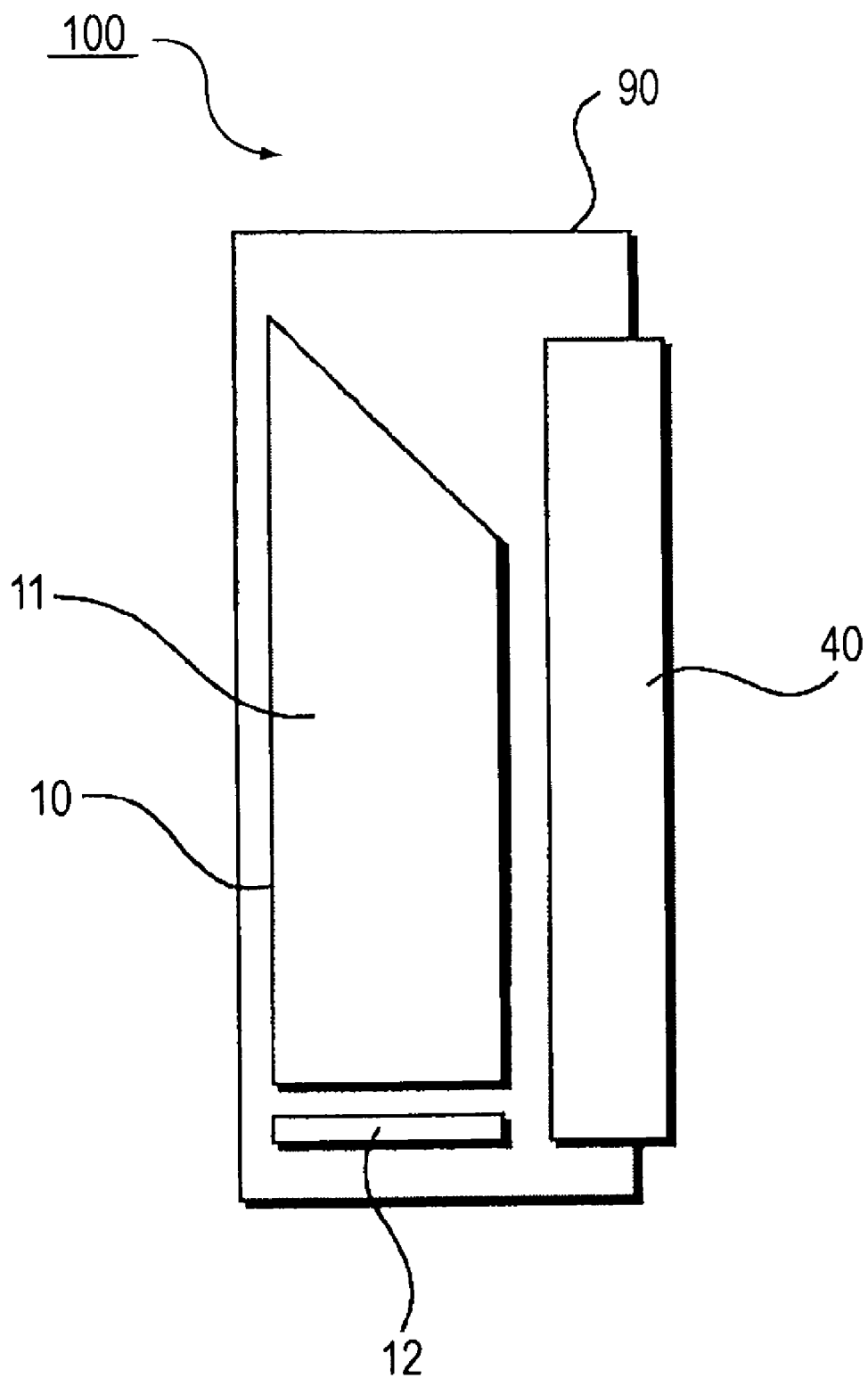
FIG. 17 is a configurational block diagram showing an embodiment of an image capture apparatus according to the present invention.

FIG. 17 is a diagram illustrating an example image capture apparatus using the zoom lens according to the present embodiment. This image capture apparatus 100 is formed mainly of a digital still camera, and includes an optical system 10 using a zoom lens 11 according to the above-described present embodiment, an imager device 12 such as a CCD (Charge Coupled Device) or a CMOS (Complementary Metal-Oxide Semiconductor), and various signal processing circuits, not shown, all of which are incorporated into a main body housing 90. A display section 40, such as a liquid crystal panel, an organic EL (Electro-Luminescence) panel, or the like, is attached to the back of the main body housing 90, allowing captured video and the like to be displayed thereon.

Figure 18:
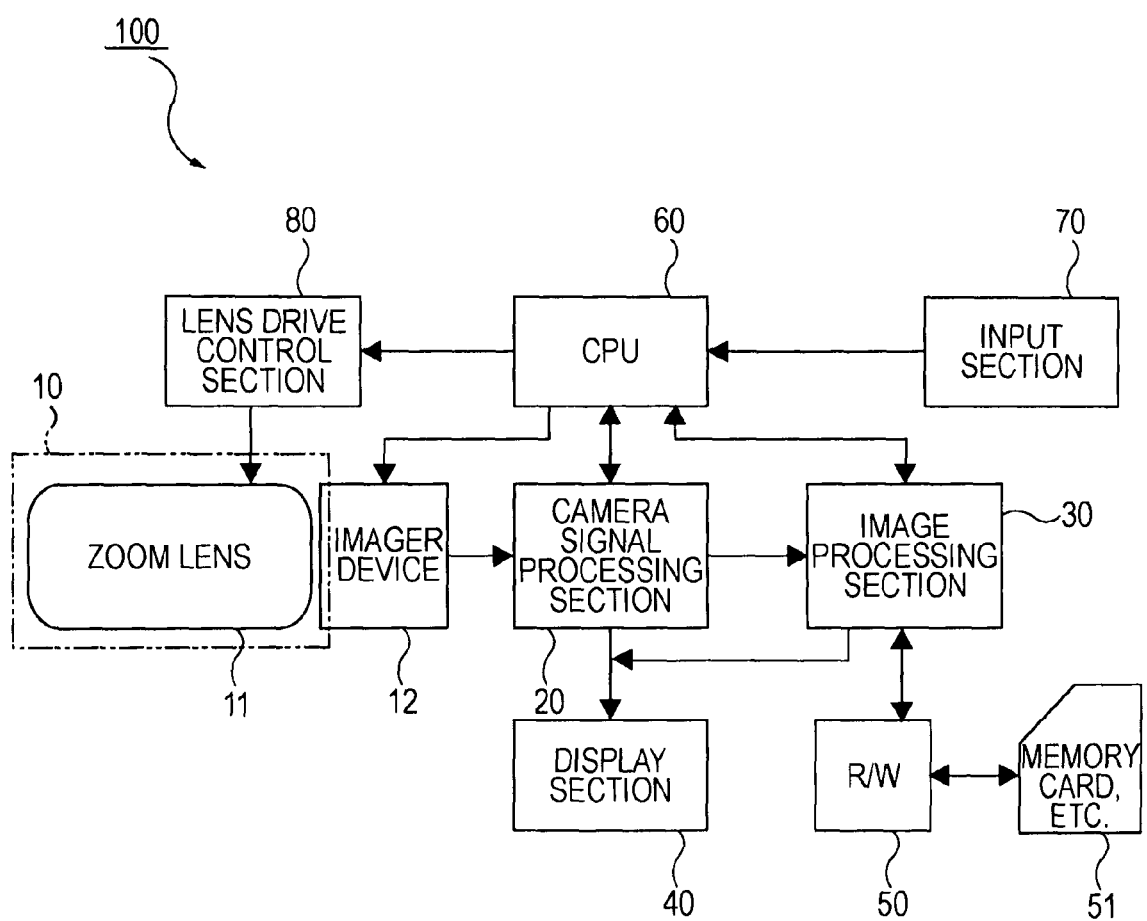
FIG. 18 is a diagram showing an example layout structure in a camera housing.

FIG. 18 is a block diagram illustrating an example internal configuration of the image capture apparatus according to the present embodiment. In the internal configuration of the image capture apparatus, there are provided the imager device 12, such as a CCD or a CMOS, converting light converged via the optical system using the zoom lens 11 according to the present embodiment, into an electrical signal, a camera signal processing section 20 performing correction processing on a captured image signal from the imager device 12, an image processing section 30 performing various signal processing such as signal compression processing on the image signal, an image storage section 51 storing the image signal as compressed into a predetermined format, a read/write control section 50 controlling reading/writing of the image signal to/from the image storage section 51, a lens drive control section 80 driving motors for performing zooming of the zoom lens 11, focusing, and shake correction, a CPU 60 performing various control, and the display section 40 such as a liquid crystal panel or an organic EL panel displaying a captured image or a stored image thereon.

Figure 19:
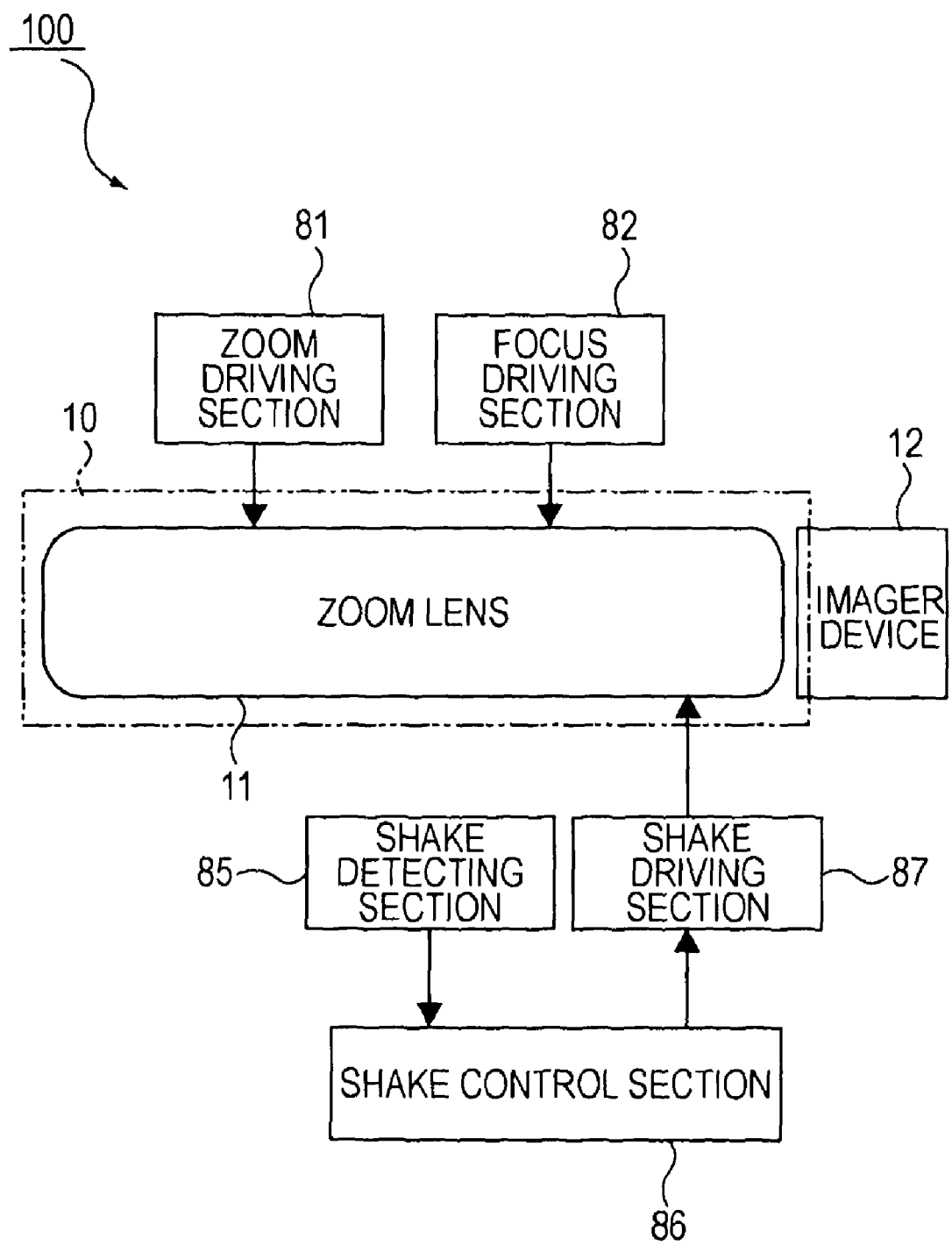
FIG. 19 is a block diagram illustrating a detailed configuration of a lens drive control section.

FIG. 19 is a block diagram illustrating a detailed configuration of the lens drive control section. The lens drive control section 80 includes a zoom driving section 81 for performing zooming of the zoom lens 11, a focus driving section 82 for performing focusing, a shake detecting section 85, a shake control section 86, and a shake driving section 87 for performing shake correction.

The zoom driving section 81 performs zooming of the zoom lens by changing separations between predetermined lens groups. Since the predetermined lens groups are moved along the optical axis during zooming, a motor for linear driving or the like is provided for each lens group to be moved. The zoom driving section 81 applies signals to drive the motors and move the lens groups by predetermined amounts. Specifically, when a zoom-up/zoom-down instruction is received by an input section 70 shown in FIG. 18 from a user, the CPU 60 gives the zoom-up/zoom-down instruction to the lens drive control section 80. On the basis of the zoom-up/zoom-down instruction, the lens drive control section 80 applies signals to the zoom driving section 81. The zoom driving section 81 in turn controls the motors responsive to the zoom-up/zoom-down instruction, with these signals to move the lens groups to be driven, thereby performing zooming up or zooming down by predetermined amounts.

In the zoom lens according to the present embodiment shown in each of FIGS. 1, 5, 13, the second lens group GR2 and the fourth lens group GR4 are the lens groups to be moved during zooming. Furthermore, in the zoom lens according to the present embodiment shown in FIG. 9, the second lens group GR2, the fourth lens group GR4, and the fifth lens group GR5 are the lens groups to be moved during zooming. Arrows shown in each figure indicate movements of the lens groups from the wide-angle end to the telephoto end during zooming.

Furthermore, the focus driving section 82 performs focusing by moving a predetermined lens group along the optical axis. Since the predetermined lens group is moved along the optical axis during focusing, a motor for linear driving or the like is provided for the lens group to be moved. The focus driving section 82 applies a signal to drive the motor and move the lens group by a predetermined amount. Specifically, an image signal captured by the imager device 12 shown in FIG. 18 is computed by the camera signal processing section 20 to detect a state of focusing, and the CPU 60 applies a signal for focusing to the lens drive control section 80. On the basis of the signal for focusing, the lens drive control section 80 applies a signal to the focus driving section 82. The focus driving section 82 in turn controls the motor with this signal to move the lens group to be driven, thereby performing focusing by a predetermined amount.

In the zoom lens according to the present embodiment shown in each of FIGS. 1, 5, 13, the fourth lens group GR4 moves in an optical axis direction to perform focusing. Furthermore, in the zoom lens according to the present embodiment shown in FIG. 9, the fourth lens group GR4 or the fifth lens group GR5 moves in an optical axis direction to perform focusing.

Furthermore, the shake correcting function in the image capture apparatus according to the present embodiment includes the shake detecting section 85, the shake control section 86, and the shake driving section 87. For example, when the imager device 12 is shaken by the pressing of a shutter release button and the shake caused thereby is detected with the shake detecting section 85 such as a gyro sensor or the like, the shake detecting section 85 forwards a signal corresponding to a shake amount to the shake control section 86, and the shake control section 86 computes a shake correcting amount for canceling the shake amount. The computation result is forwarded to the shake driving section 87, and the shake driving section 87 shifts the lens to be driven in either direction perpendicular to the optical axis by an amount equivalent to the computed shake correcting amount.

In the zoom lens according to the present embodiment shown in each of FIGS. 1, 5, 13, the lens part group SG in the fifth lens group GR5 being the final lens group is to be driven, and thus moves in either direction perpendicular to the optical axis to perform image shifting (shake correction). Furthermore, in the zoom lens according to the present embodiment shown in FIG. 9, the lens part group SG in the sixth lens group GR6 being the final lens group is to be driven, and thus moves in either direction perpendicular to the optical axis to perform image shifting (shake correction).

By applying the zoom lens 11 according to the present embodiment to such an image capture apparatus, shake correction can be realized, yet it becomes possible to decrease a lens driving range for shake correction and thus to reduce the size and thickness of the image capture apparatus.

<Method for Controlling the Zoom Lens>

A method for controlling the zoom lens according to the present embodiment is a control method for correcting a blur by using any of the earlier-described zoom lenses according to the present embodiment. Namely, it is a method for controlling a zoom lens formed of a plurality of lens groups and performing zooming by varying separations between predetermined lens groups. As the zoom lens, a lens group closest to an object side is fixed in both optical axis directions during zooming and has a reflecting member for folding an optical axis approximately 90 degrees, and a final lens group positioned closest to an image side and fixed in both optical axis directions during zooming has a lens part group SG having positive refractive power and a lens part group RG arranged adjacent to the image side of the lens part group SG and having negative refractive power. The control method is to correct the blur by shifting this lens part group SG in either direction perpendicular to the optical axis.

With this method, shake correction based on lens shifting can be realized, yet it is possible to reduce the size and thickness of the whole zoom lens including a vibration isolating unit in which a driving mechanism is arranged.

Advantages of the Embodiment

In the zoom lens according to the present embodiment, the lens part group FG having negative refractive power is arranged adjacent to the object side of the lens part group SG, thereby allowing the size and thickness reductions of the whole zoom lens to be achieved.

Furthermore, in the zoom lens according to the present embodiment, the lens part group FG having negative refractive power is made movable in an optical axis direction during zooming, thereby allowing a high zooming ratio to be achieved.

Furthermore, in the zoom lens according to the present embodiment, focusing is performed by moving a lens group positioned closer to the image side than the aperture stop along the optical axis, thereby allowing a change in view angle during focusing to be decreased.

Furthermore, in the zoom lens according to the present embodiment, aberration correction is simple, and so is its size reduction.

Furthermore, the zoom lens according to the present embodiment is constructed by arranging, in the following order from the object side, a first lens group having positive refractive power, a second lens group having negative refractive power, a third lens group having positive refractive power, a fourth lens group having negative refractive power, and a fifth lens group having positive refractive power as the final lens group, and performs zooming by moving at least the second lens group and the fourth lens group on the optical axis. Thus, it is possible to shorten the lens diameter in each group, and to achieve the size and thickness reductions of the zoom lens.

Furthermore, the zoom lens according to the present embodiment is constructed by arranging, in the following order from the object side, a first lens group having positive refractive power, a second lens group having negative refractive power, a third lens group having positive refractive power, a fourth lens group having negative refractive power, a fifth lens group having positive refractive power, and a sixth lens group having positive refractive power as the final lens group, and performs zooming by moving at least the second lens group, the fourth lens group, and the fifth lens group on the optical axis. Thus, it is possible to shorten the lens diameter in each group, and to achieve a high zooming ratio.

Furthermore, the zoom lens according to the present embodiment has at least one aspherical surface within the second lens group, so that distortion correction is simple, and so is the size reduction of the first lens group.

Furthermore, the image capture apparatus according to the present embodiment includes a shake detecting section detecting a shake of the apparatus body, a shake control section calculating a blur correcting angle for correcting a blur attributable to the shake of the image capture apparatus detected by the shake detecting section, and forwarding a driving signal to a shake driving section in order to bring the lens part group SG into a position which is based on the blur correcting angle, and the shake driving section shifting the lens part group in either direction perpendicular to the optical axis on the basis of the driving signal. Thus, a shake-correctable, small-sized, and high-performance image capture apparatus can be obtained.

The present invention is suitably applicable to small-sized image capture apparatuses, such as digital still cameras and digital video cameras, which are small- and thin-sized and in which camera shake tends to occur on releasing the shutter, and additionally to imaging-function components to be incorporated into portable telephones, personal computers, and portable terminals (PDAs).

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens formed of a plurality of lens groups and performing zooming by changing separations between predetermined lens groups, the zoom lens comprising:
   a lens group closest to an object side is fixed in both optical axis directions during zooming, and has a reflecting member for folding an optical axis approximately 90 degrees;
   a final lens group positioned closest to an image side and fixed in both optical axis directions during zooming has a lens part group SG having positive refractive power and a lens part group RG arranged adjacent to the image side of the lens part group SG and having negative refractive power; and
   a blur is corrected by shifting the lens part group SG in either direction perpendicular to the optical axis,
   wherein a combined focal length of the lens part group SG and the lens part group RG is positive.

2. A zoom lens formed of a plurality of lens groups and performing zooming by changing separations between predetermined lens groups, the zoom lens comprising:
   a lens group closest to an object side is fixed in both optical axis directions during zooming, and has a reflecting member for folding an optical axis approximately 90 degrees;
   a final lens group positioned closest to an image side and fixed in both optical axis directions during zooming has a lens part group SG having positive refractive power and a lens part group RG arranged adjacent to the image side of the lens part group SG and having negative refractive power; and
   a blur is corrected by shifting the lens part group SG in either direction perpendicular to the optical axis, and satisfying the following conditional formula (1):

$$-0.8 < fs/fr < -0.1 \tag{1}$$

where
   fs: focal length of the lens part group SG; and
   fr: focal length of the lens part group RG.

3. The zoom lens according to any one of claim 1 or 2, satisfying the following conditional formula (2):

$$0.6 < (1-\beta s) \times \beta r < 1.8 \tag{2}$$

where
   βs: transverse magnification of the lens part group SG; and
   βr: transverse magnification of the lens part group RG.

4. The zoom lens according to any one of claim 1 or 2, wherein
   a lens part group FG having negative refractive power is arranged adjacent to the object side of the lens part group SG.

5. A zoom lens, formed of a plurality of lens groups and performing zooming by changing separations between predetermined lens groups, the zoom lens comprising:
   a lens group closest to an object side is fixed in both optical axis directions during zooming, and has a reflecting member for folding an optical axis approximately 90 degrees;
   a final lens group positioned closest to an image side and fixed in both optical axis directions during zooming has a lens part group SG having positive refractive power and a lens part group RG arranged adjacent to the image side of the lens part group SG and having negative refractive power, and
   a blur is corrected by shifting the lens part group SG in either direction perpendicular to the optical axis,
   wherein a lens part group FG having negative refractive power is arranged adjacent to the object side of the lens part group SG, and moves along the optical axis during zooming.

6. The zoom lens according to any one of claims 1 or 2, wherein
   focusing is performed by causing a lens group positioned closer to the image side than an aperture stop to move on the optical axis.

7. A zoom lens formed of a plurality of lens groups and performing zooming by changing separations between predetermined lens groups, the zoom lens comprising:
   a lens group closest to an object side is fixed in both optical axis directions during zooming, and has a reflecting member for folding an optical axis approximately 90 degrees;
   a final lens group positioned closest to an image side and fixed in both optical axis directions during zooming has a lens part group SG having positive refractive power and a lens part group RG arranged adjacent to the image side of the lens part group SG and having negative refractive power; and
   a blur is corrected by shifting the lens part group SG in either direction perpendicular to the optical axis, and satisfying the following conditional formula (3):

$$0.02 < D_{SR}/fw < 0.40 \tag{3}$$

where
   $D_{SR}$: surface separation between a surface closest to the image side of the lens part group SG and a surface closest to the object side of the lens part group RG; and
   fw: focal length of a total system at a wide-angle end.

8. The zoom lens according to any one of claim 1 or 2, wherein
   the plurality of lens groups
   are arranged, in following order from the object side, a first lens group having positive refractive power, a second lens group having negative refractive power, a third lens group having positive refractive power, a fourth lens group having positive refractive power, and a fifth lens group having negative refractive power as the final lens group, and
   perform zooming by moving at least the second lens group and the fourth lens group excluding the fifth lens group, along the optical axis.

9. The zoom lens according to claim 8, wherein the second lens group has at least one aspherical surface.

10. The zoom lens according to any one of claim 1 or 2, wherein
   the plurality of lens groups
   are arranged, in following order from the object side, a first lens group having positive refractive power, a second lens group having negative refractive power, a third lens group having positive refractive power, a fourth lens group having positive refractive power, a fifth lens group having negative refractive power, and a sixth lens group having positive or negative refractive power as the final lens group, and
   perform zooming by moving at least the second lens group, the fourth lens group, and the fifth lens group excluding the sixth lens group, along the optical axis.

11. The zoom lens according to claim 10, wherein the second lens group has at least one aspherical surface.

12. An image capture apparatus including a zoom lens, and an imager device converting an optical image formed by the zoom lens into an electrical signal, wherein
   the zoom lens
   is formed of a plurality of lens groups, and performs zooming by changing separations between lens groups, and a lens group closest to an object side is fixed in both optical axis directions during zooming, and has a reflecting member for folding an optical axis at 90 degrees, a final lens group positioned closest to an image side and fixed in both optical axis directions during zooming has a lens part group SG having positive refractive power and a lens part group RG arranged adjacent to the image side of the lens part group SG and having negative refractive power, and a blur is corrected by shifting the lens part group SG in either direction perpendicular to the optical axis, wherein a combined focal length of the lens part group SG and the lens part group RG is positive.

13. An image capture apparatus including a zoom lens, and an imager device converting an optical image formed by the zoom lens into an electrical signal, wherein the zoom lens is formed of a plurality of lens groups, and performs zooming by changing separations between lens groups, and a lens group closest to an object side is fixed in both optical axis directions during zooming, and has a reflecting member for folding an optical axis at 90 degrees, a final lens group positioned closest to an image side and fixed in both optical axis directions during zooming has a lens part group SG having positive refractive power and a lens part group RG arranged adjacent to the image side of the lens part group SG and having negative refractive power, and a blur is corrected by shifting the lens part group SG in either direction perpendicular to the optical axis, and satisfying the following conditional formula (1):

$$-0.8 < fs/fr < -0.1 \tag{1}$$

where fs: focal length of the lens part group SG; and fr: focal length of the lens part group RG.

14. The image capture apparatus according to any one of claim 12 or 13, satisfying the following conditional formula (2):

$$0.6 < (1-\beta s) \times \beta r < 1.8 \tag{2}$$

where $\beta s$: transverse magnification of the lens part group SG; and $\beta r$: transverse magnification of the lens part group RG.

15. An image capture apparatus including a zoom lens, and an imager device converting an optical image formed by the zoom lens into an electrical signal, wherein the zoom lens is formed of a plurality of lens groups, and performs zooming by changing separations between lens groups, and a lens group closest to an object side is fixed in both optical axis directions during zooming, and has a reflecting member for folding an optical axis at 90 degrees, a final lens group positioned closest to an image side and fixed in both optical axis directions during zooming has a lens part group SG having positive refractive power and a lens part group RG arranged adjacent to the image side of the lens part group SG and having negative refractive power, and a blur is corrected by shifting the lens part group SG in either direction perpendicular to the optical axis, and satisfying the following conditional formula (3):

$$0.02 < D_{SR}/fw < 0.40 \tag{3}$$

where $D_{SR}$: surface separation between a surface closest to the image side of the lens part group SG and a surface closest to the object side of the lens part group RG; and fw: focal length of a total system at a wide-angle end.

16. The image capture apparatus according to any one of claim 12 or 13, comprising:

a shake detecting means for detecting a shake of an apparatus body;

a shake control means for calculating a blur correcting angle for correcting a blur attributable to the shake detected by the shake detecting means, and generating a driving signal in order to bring the lens part group SG into a position which is based on the blur correcting angle; and a shake driving section shifting the lens part group SG in either direction perpendicular to the optical axis on the basis of the driving signal generated by the shake control means.

17. A method for controlling a zoom lens formed of a plurality of lens groups and performing zooming by changing separations between predetermined lens groups, wherein a lens group closest to an object side is fixed in both optical axis directions during zooming, and has a reflecting member for folding an optical axis at 90 degrees, a final lens group positioned closest to an image side and fixed in both optical axis directions during zooming has a lens part group SG having positive refractive power and a lens part group RG arranged adjacent to the image side of the lens part group SG and having negative refractive power, and a blur is corrected by shifting the lens part group SG in either direction perpendicular to the optical axis, wherein a lens part group FG having negative refractive power is arranged adjacent to the object side of the lens part group SG, and moves along the optical axis during zooming.

* * * * *